United States Patent
Tanaka et al.

(10) Patent No.: US 8,204,642 B2
(45) Date of Patent: Jun. 19, 2012

(54) DRIVING ASSISTANCE APPARATUS

(75) Inventors: Hiromichi Tanaka, Tokai (JP); Tadashi Kamada, Nagoya (JP)

(73) Assignee: DENSO CORPORATION, Kariya (JP)

( * ) Notice: Subject to any disclaimer, the term of this patent is extended or adjusted under 35 U.S.C. 154(b) by 864 days.

(21) Appl. No.: 12/292,154

(22) Filed: Nov. 12, 2008

(65) Prior Publication Data

US 2009/0125177 A1    May 14, 2009

(30) Foreign Application Priority Data

Nov. 13, 2007  (JP) ................................. 2007-294423

(51) Int. Cl.
- G01C 22/00 (2006.01)
- G06K 9/00 (2006.01)
- B60Q 1/00 (2006.01)
- G08G 1/00 (2006.01)

(52) U.S. Cl. ............ 701/28; 701/23; 701/300; 701/301; 701/302; 382/103; 382/104; 382/181; 340/435; 340/436; 340/901; 340/903

(58) Field of Classification Search .............. 701/23, 701/28–30, 213, 300; 382/103, 104, 181; 340/435, 436, 901, 903
See application file for complete search history.

(56) References Cited

U.S. PATENT DOCUMENTS

| | | | | |
|---|---|---|---|---|
| 5,922,036 A * | 7/1999 | Yasui et al. | | 701/28 |
| 6,449,383 B1* | 9/2002 | Oike et al. | | 382/104 |
| 7,215,254 B2* | 5/2007 | Tauchi | | 340/903 |
| 7,218,758 B2* | 5/2007 | Ishii et al. | | 382/104 |
| 7,369,041 B2* | 5/2008 | Nakanishi et al. | | 340/435 |
| 7,432,799 B2* | 10/2008 | Tsuboi | | 340/435 |
| 7,583,817 B2* | 9/2009 | Kimura et al. | | 382/104 |
| 2005/0031168 A1* | 2/2005 | Katayama et al. | | 382/104 |
| 2006/0212222 A1 | 9/2006 | Miyoshi et al. | | |
| 2009/0022368 A1* | 1/2009 | Matsuoka et al. | | 382/103 |

FOREIGN PATENT DOCUMENTS

| | | |
|---|---|---|
| JP | A-H7-334798 | 12/1995 |
| JP | A-H9-159469 | 6/1997 |
| JP | A-2003-337029 | 11/2003 |
| JP | A-2005-352970 | 12/2005 |

* cited by examiner

*Primary Examiner* — James Trammell
*Assistant Examiner* — Majdi Alsomiri
(74) *Attorney, Agent, or Firm* — Posz Law Group, PLC

(57) ABSTRACT

A driving assistance apparatus that performs accurate driving assistance in accordance with actual road environment is provided. An electronic control unit (ECU) acquires shape information and vehicular swept path information about a subject vehicle and a nearby vehicle, representing vehicles and movement thereof as rectangular solids. A three-dimensional space is formed as a vehicular swept path for the rectangular solid and a road map generated based on the formed three-dimensional space. A notification is provided if the subject vehicle runs outside a space. Control support is provided to return the subject vehicle to an area indicated as safe.

28 Claims, 13 Drawing Sheets

DRIVING ASSISTANCE APPARATUS

CROSS REFERENCE TO RELATED APPLICATIONS

The present application is based on and claims priority to Japanese Patent Application 2007-294423, filed on Nov. 13, 2007, the entire contents of which are incorporated herein by reference.

BACKGROUND OF THE INVENTION

1. Field of the Invention

The present invention relates to a support apparatus that supports the driving operation of a vehicle on a road and more particularly to an apparatus that can assist in determining driving conditions that surround the vehicle on the road.

2. Description of the Related Art

A conventional apparatus, as described in JP-2003-337029 A, has been proposed that assists vehicle running in order to reduce the likelihood of traffic accidents by allowing a driver to accurately recognize positions of the other vehicles driving around the subject vehicle.

JP-2003-337029 A describes a position detection apparatus that allows a driver to recognize relative positional relation between the subject vehicle and the other vehicles.

The position detection apparatus has a global positioning system (GPS) function that provides route guidance in accordance with a map represented by stored map data. The apparatus generates information about a subject vehicle position from the GPS information and receives information about another vehicle from the vehicle using inter-vehicle communication. The apparatus maintains the relative positional relation between the subject vehicle and the other vehicle based on the information about the subject vehicle position and the other vehicle position. The apparatus matches the positions of the subject vehicle and the other vehicle with a map represented by the read map data and indicates the relative positional relation between the subject vehicle and the other vehicle on the map.

For example, the position detection apparatus having the GPS function as described in JP-2003-337029 A uses a map indicated by map data to represent an actual road shape, but in a deformed or modified form. In other words, the position detection apparatus does not faithfully represent the actual road shape. The actual road environment varies due to expansion, pavement, and repair, or new construction or destruction of surrounding buildings. Specifically, the actual road width is sometimes broadened or narrowed compared to the representation of the road width.

The position detection apparatus according to JP-2003-337029 A provides route guidance based on the stored map data and may not be able to reflect changes in the road environment in realtime.

Further, a vehicle is an object having height, width, and breadth. A conventional GPS apparatus such as the position detection apparatus according to JP-2003-337029 A represents the vehicle in a deformed or modified form such as a point.

Conventionally, therefore, it has been difficult to provide accurate driving support corresponding to an actual road environment.

SUMMARY OF THE INVENTION

The present invention has been made in consideration of the foregoing. It is therefore an object of the present invention to provide a driving support apparatus that performs an accurate driving assistance in accordance with actual road environment. It will be appreciated that, as used herein, the term "driving" can refer to various aspects and static or moving operations of the vehicle while the vehicle is underway.

To achieve the above-mentioned and other objects, a driving assistance apparatus mounted on a vehicle provides driving assistance for a driver of the vehicle. The apparatus includes a nearby vehicle dimension acquisition means, a running state information acquisition means, a space formation means, a subject vehicle dimension acquisition means, a passing determination means, and a notification control means.

Specifically, the nearby vehicle dimension acquisition means acquires an exterior dimension of a vehicle running near a subject vehicle hereafter referred to as a nearby vehicle. The running state information acquisition means acquires information indicating a running state of the nearby vehicle hereafter referred to as running state information.

The space formation means forms a virtual solid having the exterior dimension acquired by the nearby vehicle dimension acquisition means. The solid is hereafter referred to as a nearby vehicle solid. The space formation means forms a virtual three-dimensional space as a moving locus of the nearby vehicle solid by following a vehicular swept path for the nearby vehicle included in the running state information acquired by the running state information acquisition means. That is, the driving assistance apparatus virtually forms an actual vehicular swept path for the nearby vehicle.

The subject vehicle dimension acquisition means acquires an exterior dimension of the subject vehicle. The passing determination means forms a virtual solid having the exterior dimension acquired by the subject vehicle dimension acquisition means hereafter referred to as a subject vehicle solid. The passing determination means determines whether or not the subject vehicle solid is able to pass the three-dimensional space formed by the space formation means. The notification control means allows a notification apparatus provided for the subject vehicle to notify a determination result from the passing determination means.

The space formation means forms a three-dimensional space as the actual vehicular swept path for the nearby vehicle. It is possible thereby to autonomously generate road map data matching the actual road environment. In addition, it should be noted that in accordance with various exemplary embodiments, the generated road map data is not limited to a planar two-dimensional representation, but can be a three-dimensional representation having the concept of height.

The exemplary driving assistance apparatus can provide more accurate driving assistance based on the road map data adjusted to the actual road environment.

In various situations, vehicle running may be restricted due to expansion of pavement area, repair of roads, infrastructural construction such as water, electricity, and gas services, construction of various buildings, or the like. Such information about temporary or transitory conditions is not reflected on general road maps such as a printed road map or an electronic road map stored in a GPS storage medium. The driving assistance apparatus generates road map data based on a vehicular swept path actually traveled by a nearby vehicle. The road map data can reflect a narrowed or broadened road width due to the above-mentioned running restrictions. Even when a double lane or one lane each way may be restricted to either lane, the driving assistance apparatus of claim 1 generates road map data for one lane. The driving assistance apparatus can provide more accurate driving assistance.

In particular, the exemplary driving assistance apparatus notifies a driver whether or not the subject vehicle can travel in a three-dimensional space formed by the space formation means, namely a road that has been adjusted to the actual road environment. The driver can recognize safety or lack of safety associated with the vehicle running. When the lane is so narrow as to allow only a small-size car to pass through after the restriction as mentioned above, for example, the driving assistance apparatus generates road map data adjusted to the situation. The driver is notified that a large-size car cannot run the lane. The driver of the large-size car can recognize lack of safety associated with subject vehicle running.

The exemplary driving assistance apparatus can further include a position detection means for detecting a current position of the subject vehicle. The passing determination means determines whether or not the subject vehicle solid positioned at a current position of the subject vehicle detected by the position detection means is contained in the three-dimensional space formed by the space formation means. The passing determination means determines whether the subject vehicle solid is able or unable to pass through the three-dimensional space depending on whether the subject vehicle solid is able or unable to be contained in the three-dimensional space.

The driver can determine whether or not the subject vehicle is running on a road adjusted to the updated actual road environment. The driver can recognize safety or unsafety concerning updated running of the subject vehicle.

The exemplary driving assistance apparatus can further include a subject vehicle behavior detection means for detecting behavior of the subject vehicle. The passing determination means adjusts behavior of the subject vehicle solid to behavior of the subject vehicle detected by the subject vehicle behavior detection means and determines whether or not the subject vehicle solid is contained in the three-dimensional space formed by the space formation means.

The subject vehicle behavior detection means may detect behavior of the subject vehicle in realtime, at a relatively shorter timing or in accordance with a specified detection cycle such as several tens of seconds to minutes.

The exemplary driving assistance apparatus adjusts behavior of the subject vehicle solid to actual behavior of the subject vehicle, making it possible to provide more accurate driving assistance adjusted to the actual behavior of the subject vehicle. In the event of turning around, for example, the driver may feel assured when notified that the front or rear end of the subject vehicle or the subject vehicle solid happens to get out of the road as a three-dimensional space.

A nearby vehicle may be larger than or smaller than the subject vehicle or may be more than one in number. Therefore, the exemplary driving assistance apparatus further includes the ability to detect and acquire information regarding multiple nearby vehicles. The nearby vehicle dimension acquisition means acquires an exterior dimension of each of a plurality of the nearby vehicles. The running state information acquisition means acquires running state information about each of a plurality of the nearby vehicles. The space formation means forms a virtual three-dimensional space as a moving locus for each of a plurality of the nearby vehicle solids. The passing determination means uses a three-dimensional space, hereafter referred to as a maximum allowable three-dimensional space, belonging to the three-dimensional space formed by the space formation means and represents a moving locus for a largest nearby vehicle solid. The passing determination means determines whether or not the subject vehicle solid can be contained in the maximum allowable three-dimensional space.

It should further be noted that there may be multiple nearby vehicles with different sizes. When the largest nearby vehicle can travel a road or a space, the other nearby vehicles can also travel the road. It is sufficient to use the three-dimensional space as a moving locus for the largest nearby vehicle as a nearby vehicle solid.

The passing determination means uses a maximum allowable three-dimensional space formed by the space formation means to highly accurately determine safety or lack of safety associated with the subject vehicle running. For example, a narrow three-dimensional space is generated and may be incorrectly determined to be unsafe even though the actual road is wide enough for safe running. For the purpose of alerting the driver, it may be advantageous to use the three-dimensional space as a moving locus for the smallest one of nearby vehicles.

The exemplary driving assistance apparatus can obtain information about multiple nearby vehicles. The nearby vehicle dimension acquisition means acquires an exterior dimension of each of a plurality of the nearby vehicles. The running state information acquisition means acquires running state information about each of a plurality of the nearby vehicles. The space formation means forms a virtual three-dimensional space as a moving locus for each of a plurality of the nearby vehicle solids. The passing determination means uses a three-dimensional space, hereafter referred to as a frequent three-dimensional space, that belongs to the three-dimensional space formed by the space formation means and is most frequently formed. The passing determination means determines whether or not the subject vehicle solid is contained in the frequent three-dimensional space.

The exemplary driving assistance apparatus generates a three-dimensional space as road map data based on the most general vehicular swept path that is available to be used for the most general type of nearby vehicles as nearby vehicle solids. The exemplary driving assistance apparatus does not use a three-dimensional space as road map data based on the vehicular swept path for a vehicle that runs along the extreme edge of the road or in the center. Accordingly, the exemplary driving assistance apparatus can provide more accurate driving assistance.

It may be advantageous to use the most general vehicular swept path and the largest nearby vehicle solid.

The exemplary driving assistance apparatus thereby can further include a storage means for storing information representing the three-dimensional space formed by the space formation means. The passing determination means reads information representing the three-dimensional space stored in the storage means from the storage means.

Using the storage means for storing information representing three-dimensional spaces, the driving assistance apparatus can maintain an increasing amount of information representing three-dimensional spaces as road map data even while the vehicle is not running. A wider range of road map data can be covered and stored.

The exemplary driving assistance apparatus can provide accurate driving assistance at any locations by reading the stored information representing three-dimensional spaces as road map data.

In the exemplary driving assistance apparatus, the notification control means allows the notification apparatus to notify such a determination result from the passing determination means that the subject vehicle solid is unable to pass through the three-dimensional space formed by the space formation means.

According to the exemplary driving assistance apparatus, the driver can more unfailingly recognize that the subject vehicle solid cannot run the three-dimensional space formed by the space formation means, namely the road adjusted to the actual road environment as an area ensured to be capable of running. In other words, the driver can more unfailingly recognize that safe running of the subject vehicle is not ensured. The driver can effectively take such action as deceleration for avoiding an accident. The driving assistance apparatus can more effectively reduce the possibility of an accident.

In the exemplary driving assistance apparatus, the notification apparatus represents a display apparatus. The notification control means displays a determination.

By viewing the display apparatus, the driver can visually recognize a determination result or, more specifically, a determination result of the passing determination means. The driver can more unfailingly recognize safety or lack of safety associated with the running of the subject vehicle.

The exemplary driving assistance apparatus can be mounted on a vehicle and provides driving assistance for the vehicle. The exemplary driving assistance apparatus includes a nearby vehicle dimension acquisition means, a running state information acquisition means, a space formation means, a subject vehicle dimension acquisition means, and a passing determination means. The driving assistance apparatus can provide driving assistance for the subject vehicle based on a determination result from the passing determination means.

The exemplary driving assistance apparatus can provide more accurate driving assistance based on the road map data adjusted to the actual road environment and includes a position detection means for detecting a current position of the subject vehicle. The passing determination means determines whether or not the subject vehicle solid positioned at a current position of the subject vehicle detected by the position detection means is contained in the three-dimensional space formed by the space formation means. The passing determination means determines whether the subject vehicle solid is able or unable to pass through the three-dimensional space depending on whether or not the subject vehicle solid can be contained in the three-dimensional space.

The driver can determine whether or not the subject vehicle can run the road adjusted to the updated actual road environment. That is, the driver can recognize safety or lack of safety associated with updated information associated with the running of the subject vehicle.

The exemplary driving assistance apparatus includes a subject vehicle behavior detection means for detecting behavior of the subject vehicle. The passing determination means adjusts behavior of the subject vehicle solid to behavior of the subject vehicle detected by the subject vehicle behavior detection means and determines whether or not the subject vehicle solid is contained in the three-dimensional space formed by the space formation means.

The driving assistance apparatus adjusts behavior of the subject vehicle solid to actual behavior of the subject vehicle, making it possible to provide more accurate driving assistance adjusted to the actual behavior of the subject vehicle.

The driving assistance apparatus of claim 12 according to the driving assistance apparatus of claim 10 or 11 includes multiple nearby vehicles. The nearby vehicle dimension acquisition means acquires an exterior dimension of each of a plurality of the nearby vehicles. The running state information acquisition means acquires running state information about each of a plurality of the nearby vehicles. The space formation means forms a virtual three-dimensional space as a moving locus for each of a plurality of the nearby vehicle solids. The passing determination means uses a three-dimensional space, hereafter referred to as a maximum allowable three-dimensional space belonging to the three-dimensional space formed by the space formation means and represents a moving locus for a largest nearby vehicle solid. The passing determination means determines whether or not the subject vehicle solid can be contained in the maximum allowable three-dimensional space.

The passing determination means uses a maximum allowable three-dimensional space formed by the space formation means to more accurately determine safety or lack of safety associated with the subject vehicle running. For example, a narrow three-dimensional space is generated and may be incorrectly determined to be unsafe even though the actual road is wide enough for safe running. The driving assistance apparatus can address the incorrect determination. For the purpose of alerting the driver it may be advantageous to use the three-dimensional space based on the smallest one of nearby vehicles as a moving locus.

The exemplary driving assistance apparatus can acquire information regarding multiple nearby vehicles. The nearby vehicle dimension acquisition means acquires an exterior dimension of each of a plurality of the nearby vehicles. The running state information acquisition means acquires running state information about each of a plurality of the nearby vehicles. The space formation means forms a virtual three-dimensional space as a moving locus for each of a plurality of the nearby vehicle solids. The passing determination means uses a three-dimensional space, hereafter referred to as a frequent three-dimensional space, based on the three-dimensional space most frequently formed by the space formation means.

The driving assistance apparatus generates a three-dimensional space as road map data based on the most general vehicular swept path used for the most general type of nearby vehicles as nearby vehicle solids. Accordingly, the driving assistance apparatus can provide more accurate driving assistance.

It may be advantageous to use the most general vehicular swept path and the largest nearby vehicle solid. The exemplary driving assistance apparatus therefore includes a storage means for storing information representing the three-dimensional space formed by the space formation means. The passing determination means reads information representing the three-dimensional space stored in the storage means from the storage means.

The driving assistance apparatus can maintain an increasing amount of information representing three-dimensional spaces as road map data even while the vehicle is not running. The road map data can be increasingly stored. A wider range of road map data can be covered.

The driving assistance apparatus can provide accurate driving assistance at any locations by reading the stored information representing three-dimensional spaces as road map data.

The exemplary driving assistance apparatus includes a control support means for supporting a specified control object in the subject vehicle when the passing determination means that the subject vehicle solid is unable to pass through the three-dimensional space formed by the space formation means.

The subject vehicle solid may not be ensured to be capable of running in the three-dimensional space formed by the space formation means based on the road being adjusted to the actual road environment. In such case, the control support means provides control support for a specified control object in the subject vehicle and it is thereby possible to more reliably avoid an accident.

Specifically, the control support means may be constructed. In the exemplary driving assistance apparatus, the control object is a braking device provided for the subject vehicle. The control support means supports braking control using the braking device.

More specifically, the control support means may support braking control so that the braking device operates to apply the brake or decelerate the vehicle. It is possible to effectively reduce the likelihood of an accident.

In the exemplary driving assistance apparatus in accordance with an alternative embodiment, the control object is an accelerator provided for the subject vehicle. The control support means supports throttle angle control using the accelerator.

More specifically, the control support means may support throttle angle control so that a throttle angle decreases or a throttle valve closes to decelerate the vehicle. It is possible to effectively reduce the likelihood of an accident.

In the exemplary driving assistance apparatus in accordance with another alternative embodiment, the control object is a steering unit provided for the subject vehicle. The control support means supports steering control using the steering unit.

More specifically, the control support means may support steering control so that the vehicle can easily turn to a direction for avoiding a possible accident. It is thereby possible to effectively reduce the likelihood of an accident.

The exemplary driving assistance apparatus includes a nearby vehicle behavior detection means for detecting behavior of the nearby vehicle. The space formation means adjusts behavior of the nearby vehicle solid to behavior of the nearby vehicle detected by nearby vehicle behavior detection means and forms a virtual three-dimensional space as a moving locus of the nearby vehicle solid. The nearby vehicle solid forms the moving locus by following a vehicular swept path acquired by the running state information acquisition means.

The driving assistance apparatus can generate a three-dimensional space as road map data adjusted to actual behavior of the nearby vehicle. When the vehicle goes uphill or downhill, the driving assistance apparatus can generate road map data reflecting the uphill or downhill based on the vehicle behavior. Accordingly, the driving assistance apparatus can provide more accurate driving assistance.

In the exemplary driving assistance apparatus, the space formation means forms a new three-dimensional space by adding a specified extra space to a formed three-dimensional space.

In many cases, ordinary roads are wide enough for vehicles to run with sufficient allowances. Accordingly, the exemplary driving assistance apparatus can form a new three-dimensional space by adding a specified extra space to an already formed three-dimensional space so as to approximate to the actual road environment more realistically. However, using the three-dimensional space too strictly as a movement locus of the nearby vehicle solid can give rise to issues. When the space associated with the subject vehicle is larger than the nearby vehicle even by a small amount, the subject vehicle may be determined to be incapable of passing through the three-dimensional space. But since it is likely that there is some space available, such a determination is impractical. In accordance with the exemplary driving assistance apparatus, it may be advantageous to form a new three-dimensional space by excluding a specified area or a space from an already formed three-dimensional space making it possible to maintain safety of the subject vehicle running at a high level.

The exemplary driving assistance apparatus can acquire information regarding multiple nearby vehicles. The nearby vehicle dimension acquisition means acquires an exterior dimension of each of a plurality of the nearby vehicles. The running state information acquisition means acquires running state information about each of a plurality of the nearby vehicles. The space formation means forms a virtual three-dimensional space as a moving locus for each of a plurality of the nearby vehicle solids. The passing determination means uses a three-dimensional space, hereafter referred to as a maximum allowable three-dimensional space, that belongs to the three-dimensional space formed by the space formation means and represents a moving locus for a largest nearby vehicle solid. The passing determination means determines whether or not the subject vehicle solid is able to pass through the maximum allowable three-dimensional space.

The passing determination means uses a maximum allowable three-dimensional space formed by the space formation means to more highly accurately determine safety or lack of safety associated with the subject vehicle running. For example, a narrow three-dimensional space is generated and may be incorrectly determined to be unsafe even though the actual road is wide enough for safe running. For the purpose of alerting the driver, it may be advantageous to use the three-dimensional space as a moving locus for the smallest one of nearby vehicles.

The exemplary driving assistance apparatus can acquire information regarding multiple nearby vehicles. The nearby vehicle dimension acquisition means acquires an exterior dimension of each of a plurality of the nearby vehicles. The running state information acquisition means acquires running state information about each of a plurality of the nearby vehicles. The space formation means forms a virtual three-dimensional space as a moving locus for each of a plurality of the nearby vehicle solids. The passing determination means uses a three-dimensional space, hereafter referred to as a frequent three-dimensional space based on the three-dimensional space most frequently formed by the space formation means. The passing determination means determines whether or not the subject vehicle solid is able to pass through the frequent three-dimensional space.

The driving assistance apparatus generates a three-dimensional space as road map data based on the most general vehicular swept path used for the most general type of nearby vehicles as nearby vehicle solids. Accordingly, the driving assistance apparatus can provide more accurate driving assistance.

It may be advantageous to use the most general vehicular swept path and the largest nearby vehicle solid. Accordingly, in the exemplary driving assistance apparatus in accordance with alternative exemplary embodiments, the nearby vehicle dimension acquisition means acquires an overall length, an overall width, and an overall height of the nearby vehicle as exterior dimensions of the nearby vehicle. The subject vehicle dimension acquisition means acquires an overall length, an overall width, and an overall height of the subject vehicle as exterior dimensions of the subject vehicle.

Since the driving assistance apparatus acquires the maximum dimension of the nearby vehicle, it is possible to prevent a three-dimensional space as road map data from being formed to be too narrow. For example, the subject vehicle may be recognized to be small even though the subject vehicle is actually larger and could run off of a road space causing an unsafe situation. An incorrect determination may be made that assumes the subject vehicle will not run off the space. The exemplary driving assistance apparatus can prevent such an error by acquiring the maximum dimension of the subject vehicle. The safety of the subject vehicle can accordingly be maintained at a high level.

In the exemplary driving assistance apparatus, the nearby vehicle dimension acquisition means acquires a wheel base length, a tread length, and a gravity center height of the nearby vehicle as exterior dimensions of the nearby vehicle. The subject vehicle dimension acquisition means acquires a wheel base length, a tread length, and a gravity center height of the subject vehicle as exterior dimensions of the subject vehicle.

The driving assistance apparatus uses values of the wheel base length, tread length, and gravity center height for detecting vehicle behavior. The use of such data reduces the need for newly storing an exterior dimension of the vehicle.

In the exemplary driving assistance apparatus, the vehicle is provided with a storage apparatus for storing information representing an exterior dimension of the vehicle and is further provided with a communication apparatus for transmitting and receiving information between vehicles. The nearby vehicle dimension acquisition means uses the communication apparatus to acquire information stored in the storage apparatus of the nearby vehicle and represents an exterior dimension of the nearby vehicle. The subject vehicle dimension acquisition means acquires information representing an exterior dimension of the subject vehicle from the storage apparatus of the subject vehicle.

In particular, the driving assistance apparatus uses the communication apparatus to acquire information representing the exterior dimension of the nearby vehicle from the storage apparatus of the nearby vehicle. The driving assistance apparatus can autonomously and generate road map data in real-time that is adjusted to the actual road environment.

In the exemplary driving assistance apparatus, the vehicle is provided with a detection apparatus for detecting a running state of the vehicle and is provided with a communication apparatus for transmitting and receiving information between vehicles. The running state information acquisition means uses the communication apparatus to acquire information representing a running state of the nearby vehicle detected by the detection apparatus of the nearby vehicle.

In particular, the driving assistance apparatus uses the communication apparatus to acquire information representing a running state of the nearby vehicle detected by the detection apparatus of the nearby vehicle. The driving assistance apparatus can autonomously generate road map data in realtime that is adjusted to the actual road environment.

In the exemplary driving assistance apparatus, the space formation means forms a virtual rectangular solid as the nearby vehicle solid, the rectangular solid having the exterior dimension acquired by the nearby vehicle dimension acquisition means. The passing determination means forms a virtual rectangular solid as the subject vehicle solid, the rectangular solid having the exterior dimension acquired by the subject vehicle dimension acquisition means.

The driving assistance apparatus recognizes the nearby vehicle solid and the subject vehicle solid as rectangular solids simplifying various arithmetic processes compared to the use of complicated solids, reducing process loads on the driving assistance apparatus.

In the exemplary driving assistance apparatus in accordance with alternative embodiments, the nearby vehicle precedes the subject vehicle on a running route for the subject vehicle.

The driving assistance apparatus advantageously ensures safety or lack of safety associated with a route to be traveled by the subject vehicle. The exemplary driving assistance apparatus includes a storage means for storing information representing the three-dimensional space formed by the space formation means. The passing determination means reads the three-dimensional space stored in the storage means from the storage means.

The driving assistance apparatus can maintain an increasing amount of information representing three-dimensional spaces as road map data even while the vehicle is not running. The road map data can be increasingly stored. A wider range of road map data can be covered.

The driving assistance apparatus can provide accurate driving assistance at any locations by reading the stored information representing three-dimensional spaces as road map data.

BRIEF DESCRIPTION OF THE DRAWINGS

Other objects, features and characteristics of the present invention will be appreciated and become apparent to those of ordinary skill in the art and all of which form a part of the present application. In the drawings.

DETAILED DESCRIPTION OF EXEMPLARY EMBODIMENTS

Present embodiments will be described in further detail with reference to the accompanying drawings.

Figure 1:
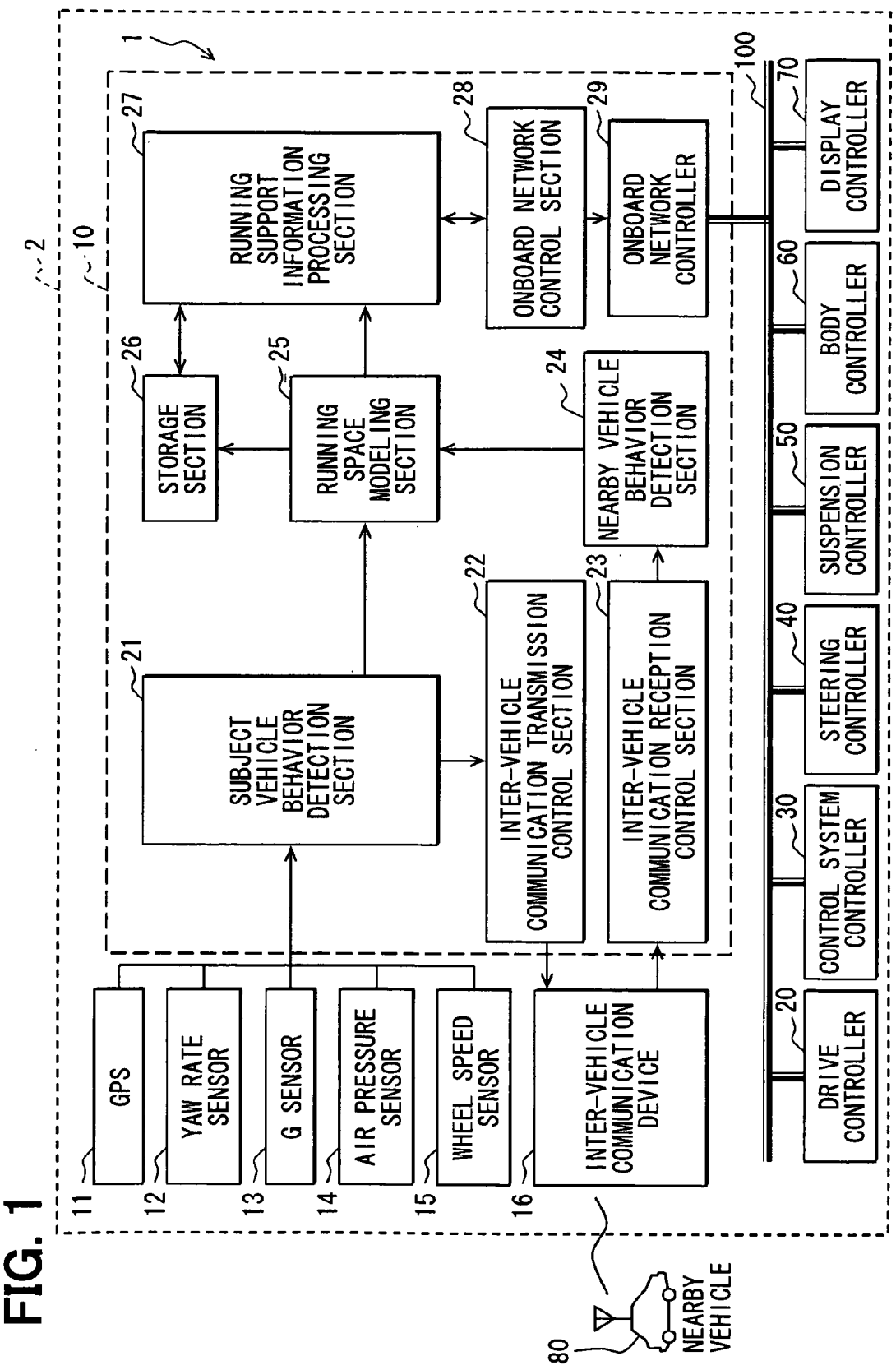
FIG. 1 is a block diagram illustrating an exemplary onboard network system.

FIG. 1 is a block diagram showing an exemplary configuration of an onboard network system 1 having an electronic control unit or ECU 10 in accordance with a present embodiment. The onboard network system 1 is mounted on a vehicle as the subject vehicle 2 or the nearby vehicle 80. The nearby vehicle 80 signifies a vehicle running near the subject vehicle 2. The vehicle uses memory (not shown) to store shape information about the vehicle such as vehicle specifications including dimensions. The following describes the onboard network system 1 on the subject vehicle 2.

In addition to the ECU 10, the onboard network system 1 includes a drive controller 20, a control system controller 30, a steering controller 40, a suspension controller 50, a body controller 60, a display controller 70, and a local area network (LAN), such as a Controller Area Network (CAN), bus 100. The drive controller 20 controls a drive system including an engine. The control system controller 30 controls various control systems. The steering controller 40 controls a steering system including a steering wheel. The suspension controller 50 controls a suspension system. The body controller 60 controls a body system including a door when opened or closed. The display controller 70 controls a vehicle-mounted display such as a liquid crystal display (not shown) for displaying images. The LAN bus 100 connects the controllers so as to be able to communicate with each other.

The onboard network system 1 includes a Global Positioning System (GPS) 11, a yaw rate sensor 12, a G sensor 13, an air pressure sensor 14, a wheel speed sensor 15, and an inter-vehicle communication device 16. The GPS 11 detects a vehicle position based on a satellite signal. The yaw rate sensor 12 detects a yaw rate that shows a change in the vehicle orientation. The G sensor 13 detects a vehicle acceleration. The air pressure sensor 14 detects an atmospheric pressure. The wheel speed sensor 15 detects a wheel revolution speed or a vehicle speed. The inter-vehicle communication device 16 detects wirelessly communicates with the nearby vehicle 80.

The ECU 10 includes a subject vehicle behavior detection section 21, an inter-vehicle communication transmission control section 22, an inter-vehicle communication reception control section 23, a nearby vehicle behavior detection section 24, a running space modeling section 25, a storage section 26, a driving assistance information processing section 27, an onboard network control section 28, and an onboard network controller 29.

The subject vehicle behavior detection section 21 detects information about the subject vehicle 2 such as a current position, attitude, traveling direction or orientation, speed, acceleration, and vehicular swept path based on values detected by the GPS 11, the yaw rate sensor 12, the G sensor 13, the air pressure sensor 14, and the wheel speed sensor 15. The information to be detected is hereafter referred to generally as the behavior of the subject vehicle 2. The subject vehicle behavior detection section 21 reads shape information as dimensions about the subject vehicle 2 from memory (not shown) that stores the shape information.

A detection result from the subject vehicle behavior detection section 21 is supplied to the inter-vehicle communication transmission control section 22 and the running space modeling section 25 to be described later.

The inter-vehicle communication transmission control section 22 controls the inter-vehicle communication device 16. Using the inter-vehicle communication device 16, the inter-vehicle communication transmission control section 22 transmits or broadcasts a detection result from the subject vehicle behavior detection section 21 to the nearby vehicle 80.

The inter-vehicle communication reception control section 23 controls the inter-vehicle communication device 16. Using the inter-vehicle communication device 16, the inter-vehicle communication reception control section 23 receives a detection result from the subject vehicle behavior detection section in the nearby vehicle 80. The detection result indicates behavior information and shape information about the nearby vehicle 80. The information received by the inter-vehicle communication reception control section 23 from the nearby vehicle 80 is supplied to the nearby vehicle behavior detection section 24.

The nearby vehicle behavior detection section 24 receives the information indicating the behavior of the nearby vehicle 80 and the shape information about the same from the nearby vehicle 80 via the inter-vehicle communication device 16 and the inter-vehicle communication reception control section 23. The nearby vehicle behavior detection section 24 detects the behavior and the dimension of the nearby vehicle 80 based on the received information. A detection result from the nearby vehicle behavior detection section 24 is supplied to the running space modeling section 25 to be described.

The running space modeling section 25 recognizes the subject vehicle 2 as a rectangular solid having dimensions indicated by the shape information about the subject vehicle 2. This rectangular solid is hereafter referred to as an subject-vehicle rectangular solid. The running space modeling section 25 virtually forms the subject-vehicle rectangular solid. The running space modeling section 25 recognizes the nearby vehicle 80 as a rectangular solid having dimensions indicated by the shape information about the nearby vehicle 80 hereafter referred to as a nearby-vehicle rectangular solid. The running space modeling section 25 virtually forms the nearby-vehicle rectangular solid.

Based on the detection result from the subject vehicle behavior detection section 21, the running space modeling section 25 generates information about a three-dimensional space representing a vehicular swept path for the subject vehicle 2 as a subject-vehicle rectangular solid. Based on the detection result from the nearby vehicle behavior detection section 24, the running space modeling section 25 generates information about a three-dimensional space representing a vehicular swept path for the nearby vehicle 80 as a nearby-vehicle rectangular solid. The three-dimensional space acts as the vehicular swept path for the subject-vehicle rectangular solid or the nearby-vehicle rectangular solid. The three-dimensional space is generated by moving a geometric center such as a gravity center of the subject-vehicle rectangular solid or the nearby-vehicle rectangular solid so as to coincide with the vehicular swept path of the subject vehicle 2 or the nearby vehicle 80.

Vehicle running is ensured in the three-dimensional spaces representing the vehicular swept paths for the subject vehicle 2 as an subject-vehicle rectangular solid and the nearby vehicle 80 as a nearby-vehicle rectangular solid. The three-dimensional spaces are used as road map data according to the present embodiment.

Information about the three-dimensional spaces generated by the running space modeling section 25 is stored as a three-dimensional map as road map data in the storage section 26. Depending on cases, the running space modeling section 25 supplies the three-dimensional space information directly to the driving assistance information processing section 27.

Detection results from the subject vehicle behavior detection section 21 and the nearby vehicle behavior detection section 24 are supplied to the driving assistance information processing section 27 via the running space modeling section 25.

The driving assistance information processing section 27 acquires a three-dimensional space map as road map data that is stored in the storage section 26 and is applicable within a specified range from the subject vehicle 2. In the present example, the specified range is defined as a circle with radius 100 m around the subject vehicle 2. The value 100 m is an example and may be specified variously in consideration for a distance long enough to control an intended vehicle. For example, the distance may be determined by multiplying the speed of the subject vehicle 2 by ten seconds.

Based on the behavior and dimensions of the subject vehicle 2 as a subject-vehicle rectangular solid, the driving assistance information processing section 27 determines whether or not the subject vehicle 2 is capable of running on a road as a three-dimensional space represented by the read road map data and is located on that road.

Based on the detection result, the driving assistance information processing section 27 determines which direction is safe or dangerous for the subject vehicle 2 as an subject-vehicle rectangular solid to run or whether or not the subject vehicle 2 needs to decelerate. In other words, the driving assistance information processing section 27 performs a determination process for ensuring safe running of the subject vehicle 2.

Based on the determination result, the driving assistance information processing section 27 transmits a target control value for ensuring safe running of the subject vehicle 2 to the LAN bus 100 via the onboard network control section 28 and the onboard network controller 29. Based on the target control value from the ECU 10, the drive controller 20, the control system controller 30, the steering controller 40, the suspension controller 50, the body controller 60, and the display controller 70 provide specified controls.

The onboard network controller 29 transmits or receives data from the LAN bus 100. The onboard network control section 28 controls or negotiates with the onboard network controller 29.

Figure 2A:
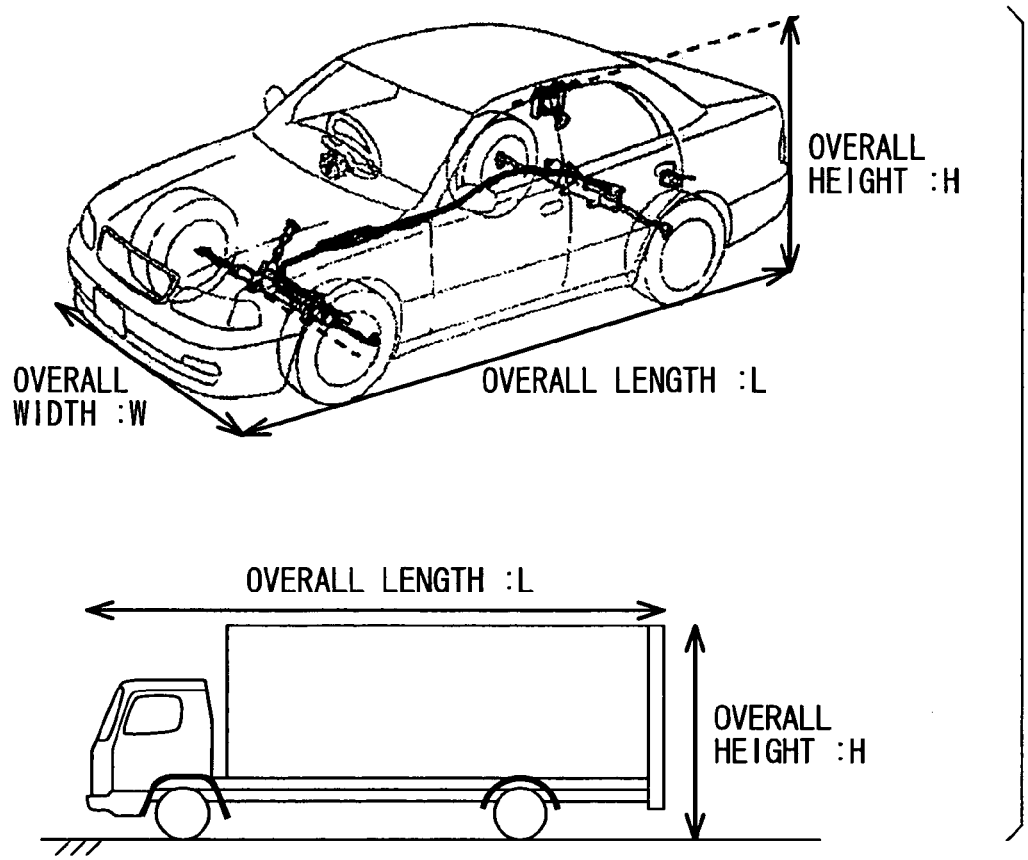
FIG. 2A is a diagram illustrating various vehicle dimensions.
Figure 2B:
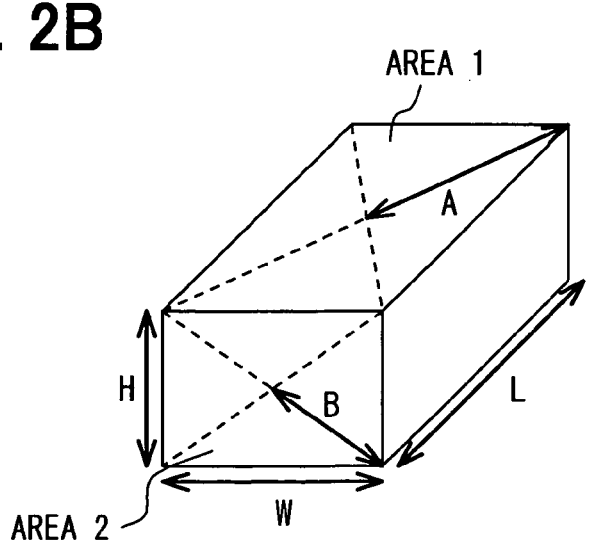
FIG. 2B is a diagram illustrating an exemplary vehicle solid.

FIG. 2A and FIG. 2B illustrate vehicle dimensions indicated by the shape information. As shown, for example, in FIG. 2A, vehicle dimensions are defined by an overall length L, an overall width W, and an overall height H. FIG. 2A shows examples of a passenger car and a heavy duty vehicle such as a trailer truck.

The overall length L ranges from the front end such as a front bumper to the rear end such as a rear bumper of the vehicle. The overall width signifies a full width of the vehicle such as a distance between left and right side-view mirrors.

The overall height ranges from a contact area or a land surface of a vehicle tire to a vehicle top equivalent to the highest position. As shown in FIG. 2B, the vehicle according to the embodiment is recognized as a rectangular solid having the overall length L, the overall width W, and the overall height H. The dimension A can be defined as half a diagonal line length of an area 1 represented by W×L. The dimension B can be defined as half a diagonal line length of an area 2 represented by H×W.

Figure 3:
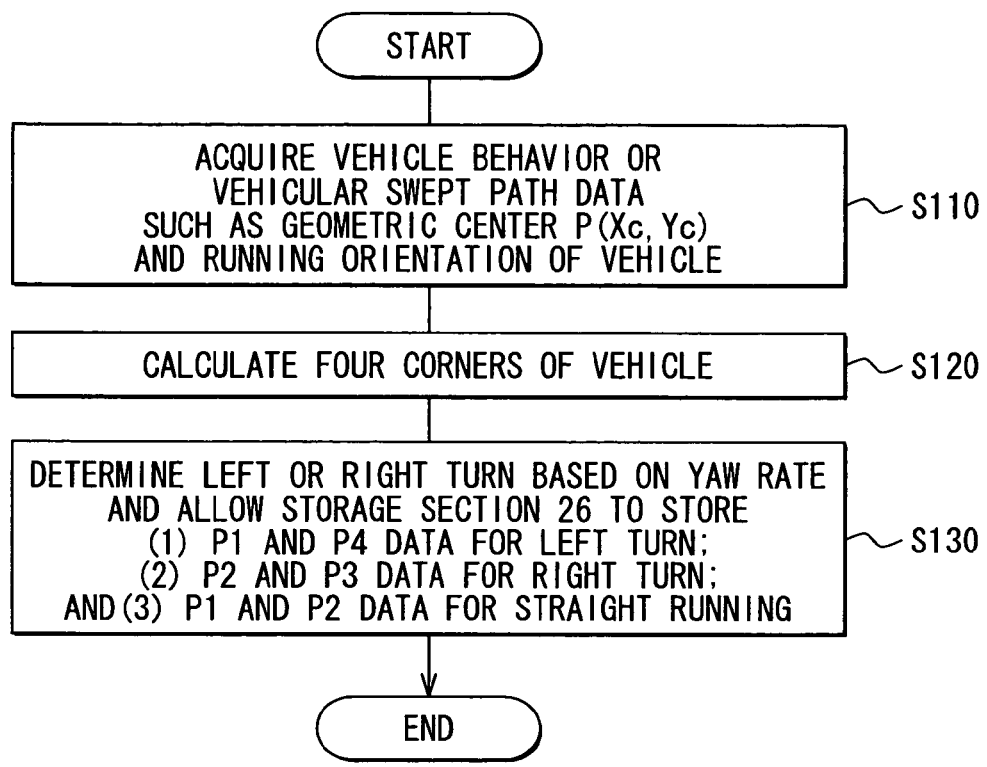
FIG. 3 is a flow chart illustrating an exemplary process performed in association with running space modeling.

The following describes processes performed, for example, by the ECU 10. FIG. 3 is a flow chart showing a process performed periodically in the running space modeling section 25. The same process is performed for the subject vehicle 2 and the nearby vehicle 80. The following describes the process performed for the subject vehicle 2.

At S110, the running space modeling section 25 acquires a geometric center P ($X_c, Y_c$) and a behavior such as a vehicular swept path of the subject vehicle 2 based on the detection result from subject vehicle behavior detection section 21. As mentioned above, the subject vehicle 2 is recognized as a rectangular solid or an subject-vehicle rectangular solid having the length or the overall length L, the width or the overall width W, and the height or the overall height H. The geometric center P($X_c, Y_c$) corresponds to the center or the gravity center of the subject-vehicle rectangular solid.

Figure 4A:
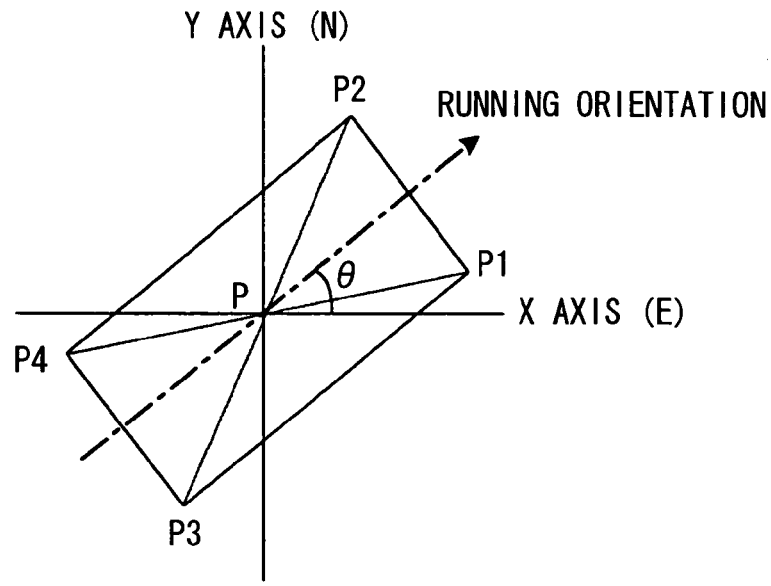
FIG. 4A is a graph illustrating X-Y coordinate points for an exemplary vehicle.
Figure 4B:
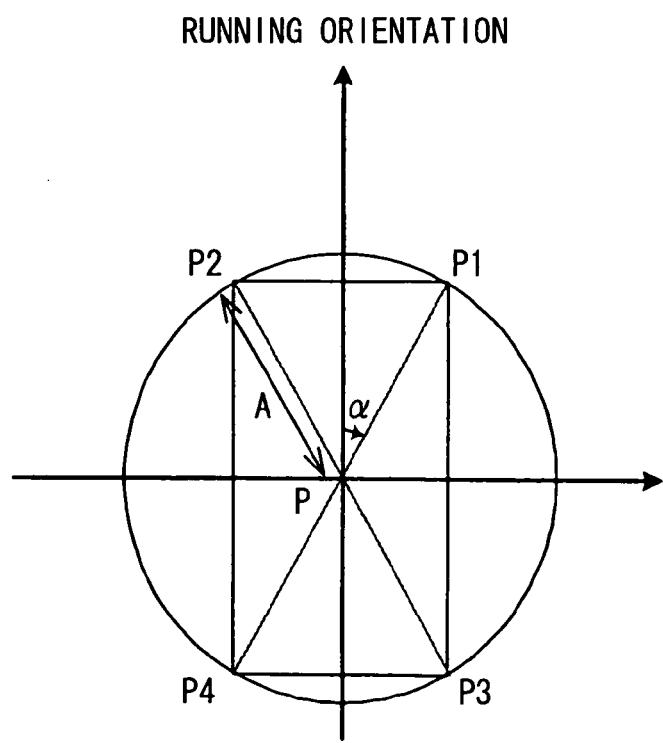
FIG. 4B is a graph further illustrating X-Y coordinate points for an exemplary vehicle.

At S120, the running space modeling section 25 calculates coordinates for four corners of the subject vehicle 2 as an subject-vehicle rectangular solid. The running space modeling section 25 calculates coordinates on an X-Y plane. As shown in FIG. 4A and FIG. 4B, the running space modeling section 25 calculates coordinates P1, P2, P3, and P4 for four corners of the subject vehicle 2 as an subject-vehicle rectangular solid around the geometric center P($X_c, Y_c$) of the subject vehicle 2. In FIG. 4A, θ denotes the running direction or orientation of the subject vehicle 2 as the subject-vehicle rectangular solid. See also FIG. 5. In FIG. 4B, "α" denotes an angle between the running orientation and the diagonal line of the subject-vehicle rectangular solid.

Figure 5:
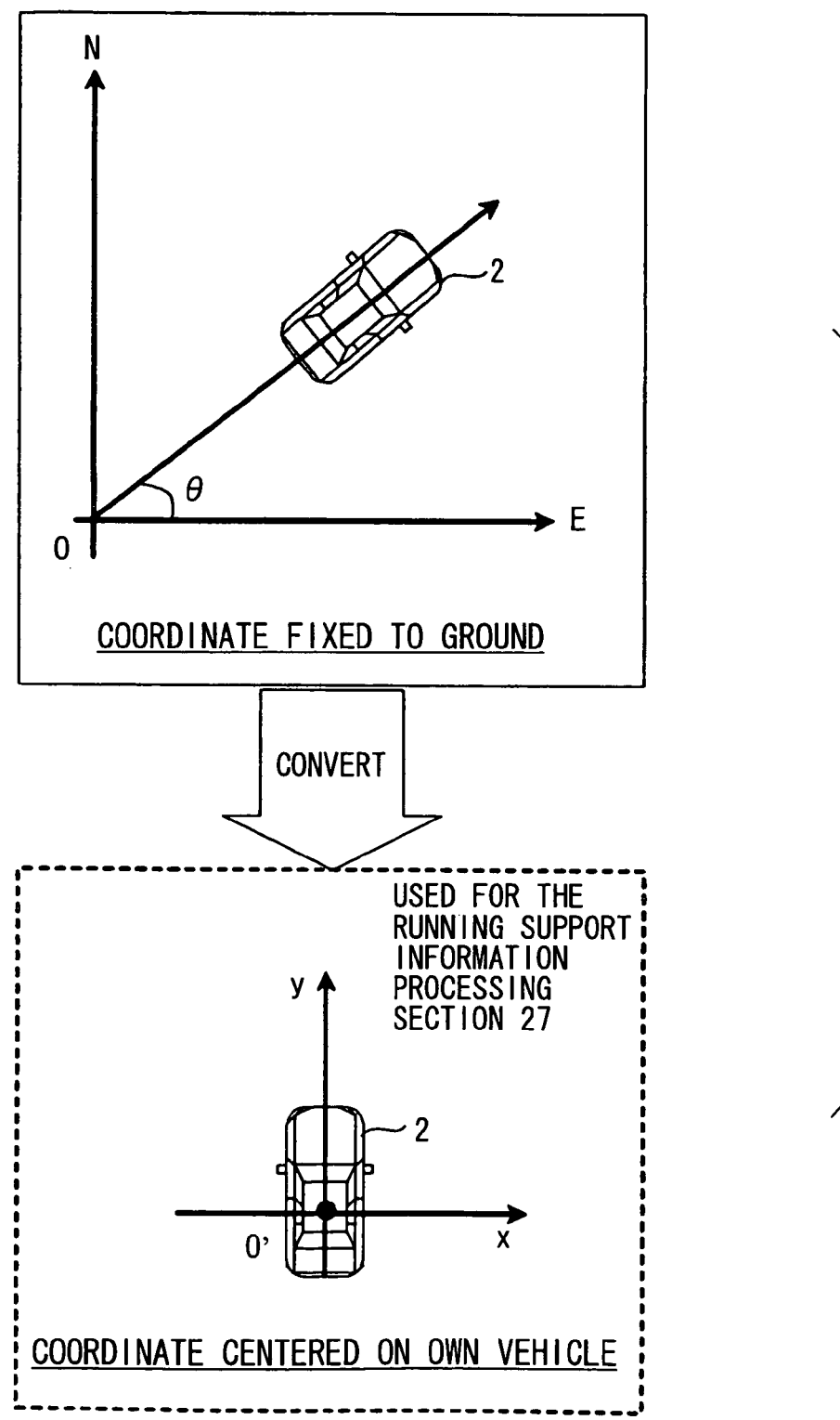
FIG. 5 is a diagram illustrating exemplary conversion and fixing of X-Y coordinate systems.

As shown in the upper portion of FIG. 5, for example, the orientation θ for the subject vehicle 2 to run can be determined based on assuming the upper portion of the Y axis as pointing north and having a relative angle of 90 degrees and the right portion of the X axis pointing to the east at 0 degrees. A lower part of FIG. 5 shows a coordinate system with reference to a traveling direction along the Y axis of the subject vehicle 2. The coordinate system is used for a calculation process of the driving assistance information processing section 27.

The following equations (1) through (5) can be used to calculate coordinates P1 through P4. Equation 1 (EQ 1) can be used to calculate the coordinate P1 ($X_1, Y_1$) as follows.

$$P1\begin{bmatrix} X_1 \\ Y_1 \end{bmatrix} = \begin{bmatrix} X_c \\ Y_c \end{bmatrix} + A\begin{bmatrix} \cos(\theta - \alpha) \\ \sin(\theta - \alpha) \end{bmatrix} \quad \text{(EQ 1)}$$

Equation 2 (EQ 2) can be used to calculate the coordinate P2 ($X_2, Y_2$) as follows.

$$P2\begin{bmatrix} X_2 \\ Y_2 \end{bmatrix} = \begin{bmatrix} X_c \\ Y_c \end{bmatrix} + A\begin{bmatrix} \cos(\theta + \alpha) \\ \sin(\theta + \alpha) \end{bmatrix} \quad \text{(EQ 2)}$$

Equation 3 (EQ 3) can be used to calculate the coordinate P3 ($X_3, Y_3$) as follows.

$$P3\begin{bmatrix} X_3 \\ Y_3 \end{bmatrix} = \begin{bmatrix} X_c \\ Y_c \end{bmatrix} + A\begin{bmatrix} \cos(-\theta + \alpha) \\ \sin(-\theta + \alpha) \end{bmatrix} \quad \text{(EQ 3)}$$

Equation 4 (EQ 4) can be used to calculate the coordinate P4 ($X_4, Y_4$) as follows.

$$P4\begin{bmatrix} X_4 \\ Y_4 \end{bmatrix} = \begin{bmatrix} X_c \\ Y_c \end{bmatrix} + A\begin{bmatrix} \cos(-\theta - \alpha) \\ \sin(-\theta - \alpha) \end{bmatrix} \quad \text{(EQ 4)}$$

Equation 5 (EQ 5) can be used to express α and A in equations (1) through (4) as follows.

$$\alpha = \arctan\left(\frac{W}{L}\right) \quad A = \sqrt{\left(\frac{W}{2}\right)^2 + \left(\frac{L}{2}\right)^2} \quad \text{(EQ 5)}$$

Now referring back to FIG. 3, at S130, the running space modeling section 25 determines whether the vehicle is going to turn to the left, turn to the right, or go straight, based on a detection result from the yaw rate sensor 12. The running space modeling section 25 allows the storage section 26 to store values of the coordinates P1 and P4 when determining to turn to the left, values of the coordinates P2 and P3 when determining to turn to the right, or values of the coordinates P1 and P2 when determining to go straight. The process then terminates. S130 is intended to store two coordinates for drawing a locus farthest from the geometric center P so as to represent the most swelled part of the locus.

The above described process will be described in more detail with reference to FIG. 6, which shows an example where a vehicle, such as a truck in the present example, turns to the left. Below the side view of the truck, is a view of the truck from the bottom.

Figure 6:
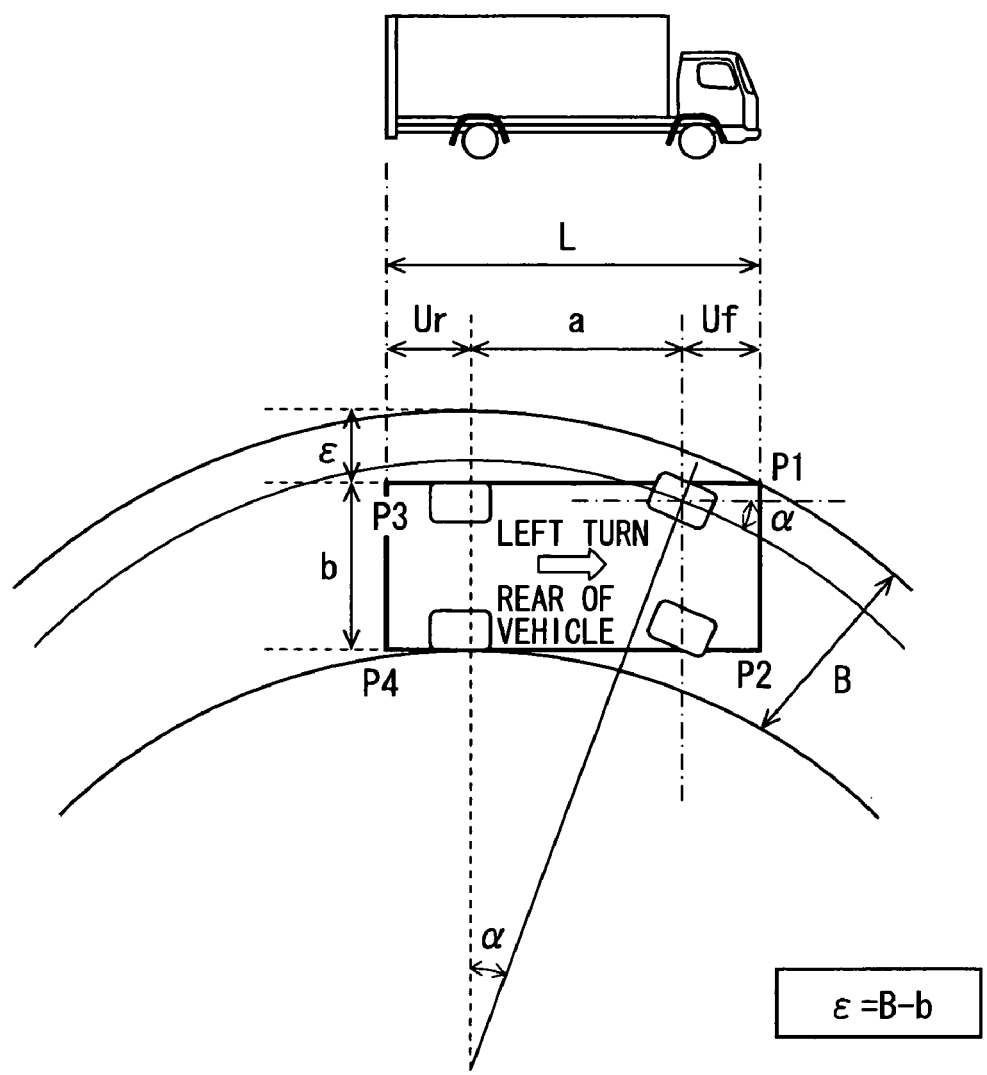
FIG. 6 is a diagram illustrating an exemplary path of a turning vehicle.

In FIG. 6, L denotes an overall length of the truck, α denotes a wheel base thereof, and b denotes an overall width thereof. Uf denotes a front overhang between a front-wheel axle center and the front end thereof. Ur denotes a rear overhang between a rear-wheel axle center and the rear end thereof.

In FIG. 6, B denotes a vehicle running width of an area occupied by the truck during running. The vehicle running width is found by adding a specified amount of diffusion ϵ to the overall width b of the truck. In the present example, the vehicle running width B is formed by the loci for P1 and P4 out of the four corners of the truck.

When the truck turns to the right, though not shown, the vehicle running width B is formed by the loci for P2 and P3 out of the four corners of the truck. The running space modeling section 25 uses the coordinate information stored in the storage section 26 as needed when generating three-dimensional space information. The driving assistance information processing section 27 uses the coordinate information stored in the storage section 26 as needed when recognizing the vehicle behavior. When the vehicle is determined to go straight at S130 in FIG. 3, the running space modeling section 25 may allow the storage section 26 to store values of the coordinates P3 and P4.

Figure 7:
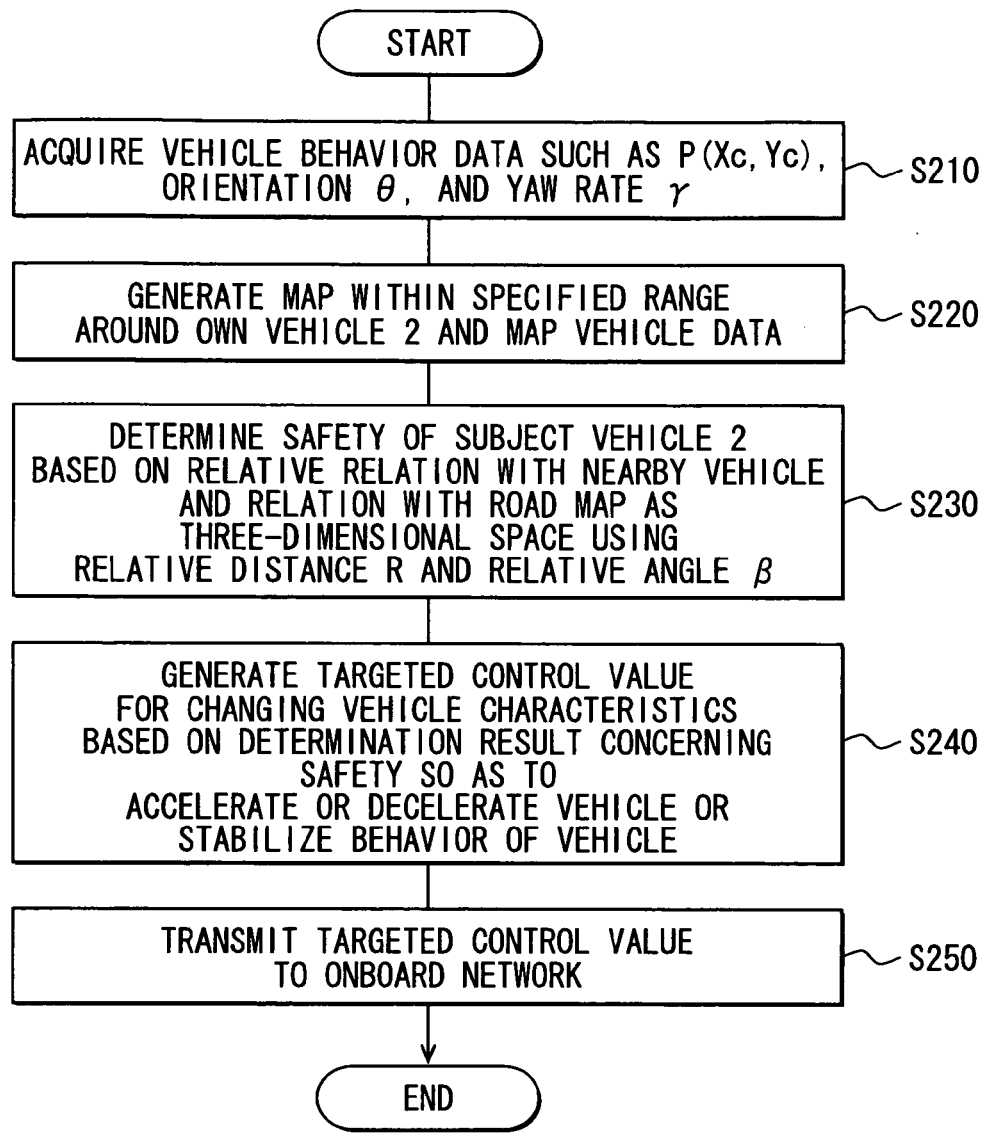
FIG. 7 is a flow chart illustrating an exemplary process performed in association with driving assistance information processing.

FIG. 7 is a flow chart showing a process performed by, for example, the driving assistance information processing section 27. The process is performed periodically or in realtime. At S210, the driving assistance information processing section 27 uses a detection result from the subject vehicle behavior detection section 21 or the nearby vehicle behavior detection section 24 to acquire vehicle behavior data such as the geometric center P(Xc,Yc) of the subject vehicle 2 or the nearby vehicle 80, the orientation θ for the subject vehicle 2 or the nearby vehicle 80 to run, and the yaw rate r.

At S220, the driving assistance information processing section 27 assumes the geometric center P of the subject vehicle 2 to be the coordinate center and generates a map or road map in the three-dimensional space within a specified range around the center R Specifically, the driving assistance information processing section 27 reads the map or road map in the three-dimensional space from the storage section 26. The driving assistance information processing section 27 maps the nearby vehicle 80 existing in the specified range onto the generated map.

Figure 8:
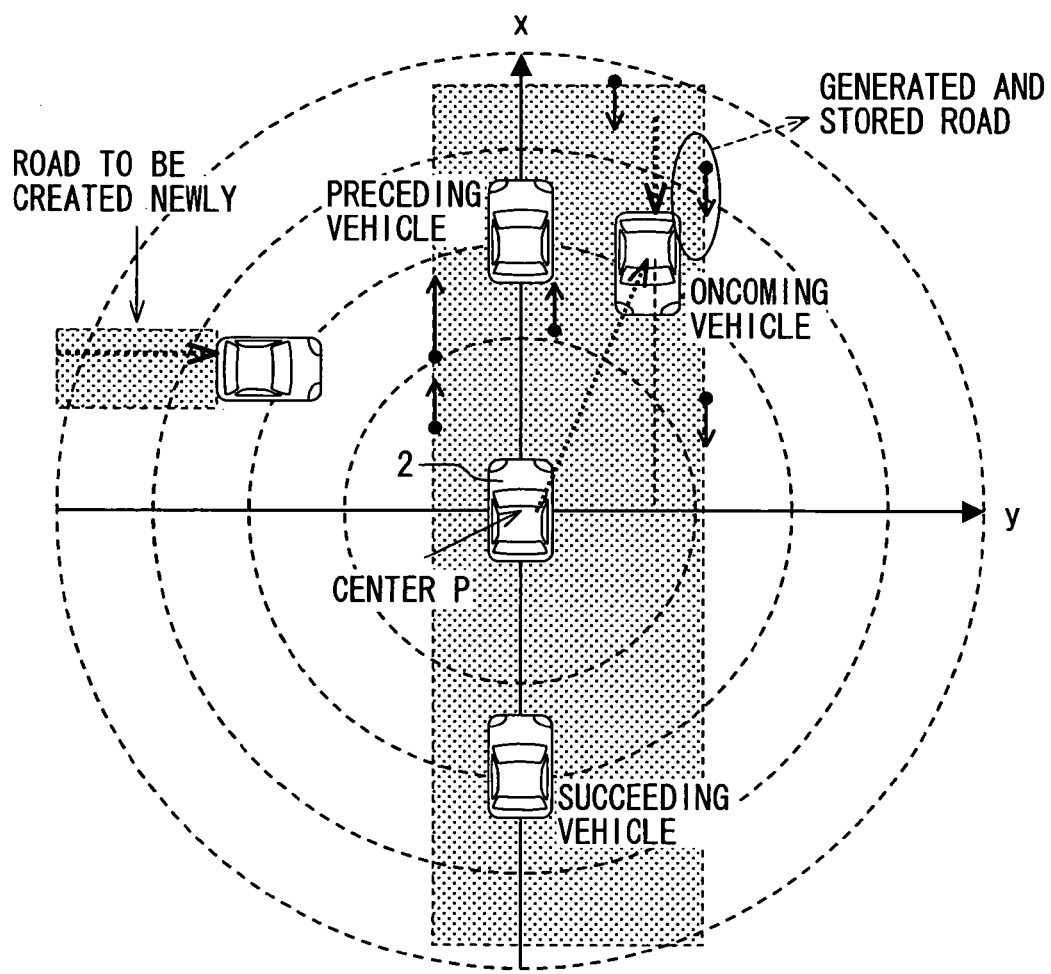
FIG. 8 is a diagram illustrating exemplary map generation and mapping of a nearby vehicle.

FIG. 8 shows an example of map generation and mapping of the nearby vehicle 80. As shown, the map or road map is generated within the specified range around the geometric center P of the subject vehicle 2. The nearby vehicle 80 in the specified range is mapped. As mentioned above, vehicular swept paths for the subject vehicle 2 and the nearby vehicle 80 as the subject-vehicle rectangular solid and the nearby-vehicle rectangular solid represent the road map. Some road map data was generated in the past and is stored in the storage section 26 and other map data is newly generated.

Now referring again to FIG. 7, the driving assistance information processing section 27, at S230 determines safety of the subject vehicle 2 in accordance with relative relation such as a relative position or a relative speed with the nearby vehicle and the generated map or road map.

Specifically, the driving assistance information processing section 27 uses, for example, the relative positional relation and the relative speed relation between the subject vehicle 2 and the nearby vehicle 80 to determine a possibility of collision between the subject vehicle 2 and the nearby vehicle 80. The driving assistance information processing section 27 determines whether a subject-vehicle rectangular solid representing the subject vehicle 2, is able to pass through or can be positioned within a three-dimensional space representing a road.

At S240, the driving assistance information processing section 27 calculates a targeted control value for improving the safety when the safety is determined to be low as the determination result at S230. Specifically, the driving assistance information processing section 27 generates targeted control values for accelerating or decelerating the vehicle or stabilizing the behavior of the vehicle.

At S250, the driving assistance information processing section 27 transmits the targeted control values calculated at S240 to the LAN bus 100. The process then terminates. In such a manner, the drive controller 20, the control system controller 30, the steering controller 40, the suspension controller 50, the body controller 60, and the display controller 70 in the subject vehicle 2 provide specified controls as needed based on the targeted control values.

The drive controller 20 or the control system controller 30 decelerates the subject vehicle 2 by decreasing the engine revolution, driving the brake, or closing the throttle as needed when the driving assistance information processing section 27 determines a degraded safety level and issues a proper instruction. The steering controller 40 provides control so that the subject vehicle 2 can easily avoid an obstacle as needed when the driving assistance information processing section 27 determines a degraded safety level and issues a proper instruction. The display controller 70 displays an indication of the lack of safety on a display (not shown) provided for the subject vehicle 2 as needed when the driving assistance information processing section 27 determines a degraded safety level and issues a proper instruction. Even when the driving assistance information processing section 27 ensures the safety, the display controller 70 may display the driving assistance information on the display.

FIG. 9 through FIG. 13 show various effects in accordance with one or more embodiments. With reference to FIG. 9A to FIG. 9C, it can be assumed that the subject-vehicle rectangular solid and the nearby-vehicle rectangular solid correspond respectively the subject vehicle 2 and the nearby vehicle 80. The behavior of the solids associated with the subject vehicle 2 and the nearby vehicle 80 is assumed to be a rigid motion. The subject vehicle 2 or the nearby vehicle 80 as the subject-vehicle rectangular solid or the nearby-vehicle rectangular solid moves along a vehicular swept path. The vehicular swept path is virtually formed as a three-dimensional space. The three-dimensional space is used as the road map.

Figure 9A:
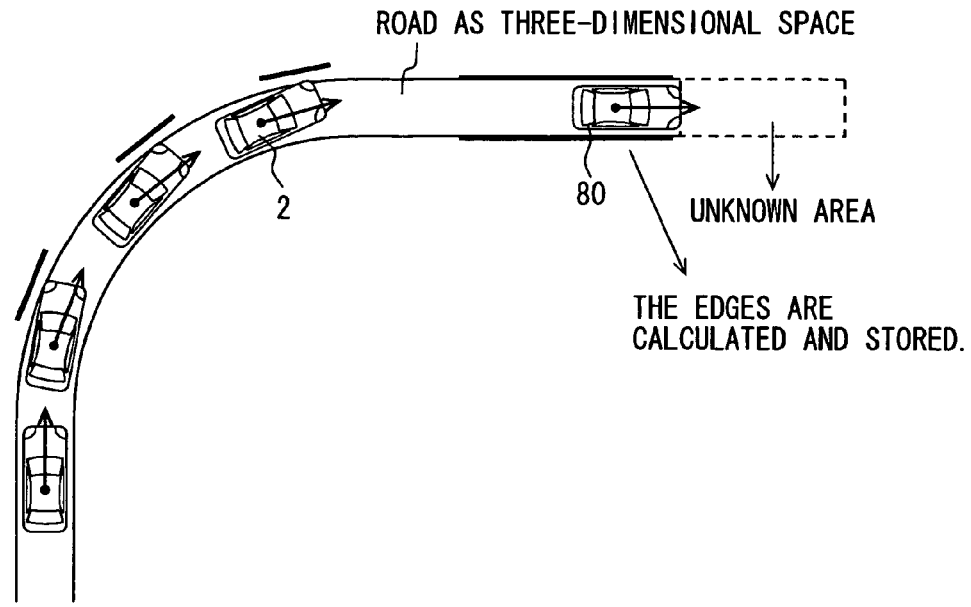
FIG. 9A is a diagram illustrating an effect of an exemplary embodiment.

In FIG. 9A, the nearby vehicle 80 precedes the subject vehicle 2 along a vehicular swept path, which is used as a road map. When the nearby vehicle 80 has not yet traveled in an area, the area itself may be unknown and it is further unknown whether or not a road exists in the area. The subject vehicle 2 uses the inter-vehicle communication to acquire the dimensions or the behavior such as the vehicular swept path for the nearby vehicle 80. When there are nearby vehicles 80 preceding the subject vehicle 2 in FIG. 9A, the vehicular swept path for a larger nearby vehicle 80 is used as the road map. Specifically, the storage section 26 stores three-dimensional spaces as vehicular swept paths for multiple nearby vehicles 80. The three-dimensional space information stored in the storage section 26 is associated with the largest nearby vehicle 80 and is used as the road map data.

The road map can be rendered from not only the vehicular swept path for the nearby vehicle 80 but also the vehicular swept path for the subject vehicle 2. It can be determined whether the subject vehicle 2 can pass through or is positioned within the vehicular swept path for the nearby vehicle 80. The vehicular swept path for the nearby vehicle 80 has a boundary as a virtual wall the subject vehicle 2 is requested to avoid crossing over. The area indicating the vehicular swept path for the nearby vehicle 80 is ensured as a road capable of running. On the other hand, an area outside the vehicular swept path is not ensured to be capable of running.

Figure 9B:
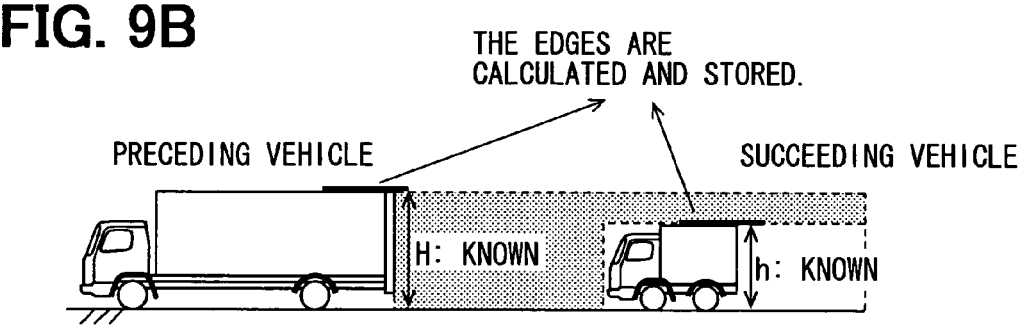
FIG. 9B is a diagram illustrating another effect of an exemplary embodiment.
Figure 9C:
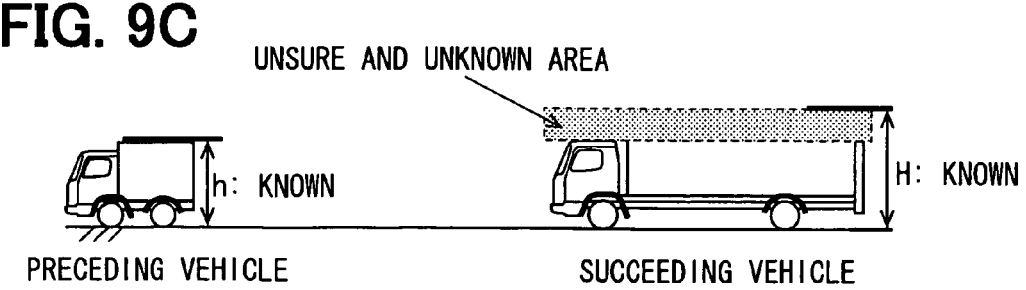
FIG. 9C is a diagram illustrating still another effect of an exemplary embodiment.

The description about the X-Y plane example in FIG. 9A also applies to the Z-axis direction or the height direction. FIG. 9B and FIG. 9C show examples of road space in the height direction. In FIG. 9B, a succeeding truck can use the inter-vehicle communication to recognize an overall height H of a preceding vehicle as trailer. The vehicular swept path for the preceding vehicle as trailer is used as road map data. FIG. 9B shows that the overall height H of the preceding vehicle as trailer is larger than an overall height h of the succeeding truck. When the vehicular swept path is formed as a road space for the preceding vehicle, when the preceding vehicle is, for example, a trailer, the road space is recognized as a having sufficient space in terms of the height direction such that the succeeding truck can also travel.

In FIG. 9C, the overall height H of the succeeding vehicle, when the succeeding vehicle is, for example, a trailer, is larger than the overall height h of the preceding truck. Thus the portion of the road space that exceeds the road space established by the preceding truck is recognized to be an unknown area where the capability of running is not ensured. The information about the lack of safety is displayed on the display provided for the succeeding vehicle as trailer, for example.

Figure 10:
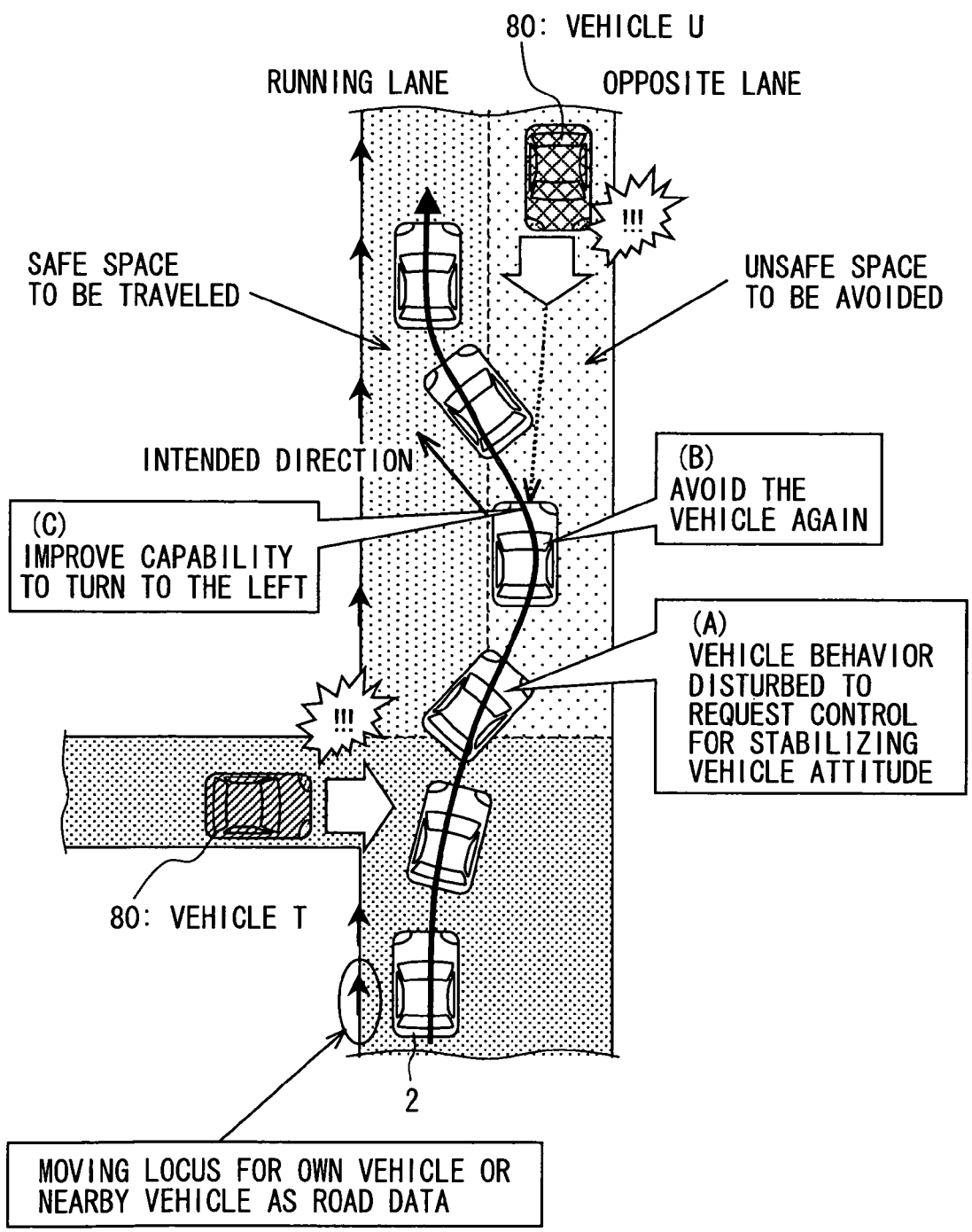
FIG. 10 is a diagram illustrating a collision avoidance effect and other effects of an exemplary embodiment.

FIG. 10 shows a driving assistance provided under control of the ECU 10. Let us suppose that a driver of the subject vehicle 2 turns a steering wheel to avoid a contact with the nearby vehicle 80, shown as vehicle T, which is approaching from the side of the subject vehicle 2. In order to avoid possible contact, the subject vehicle 2 deviates from a safe space appropriate for running to an unsafe space inappropriate for running. As mentioned above, the road map is generated by using the vehicular swept path for the subject vehicle 2 as a subject-vehicle rectangular solid taking into consideration the nearby vehicle 80, such as vehicle T or U in FIG. 10. A running lane or an opposite lane is determined based on the vehicular swept paths for the subject vehicle 2 and the nearby vehicle 80. In the present example, the running lane is the safe space where the subject vehicle 2 prefers running. The opposite lane is the unsafe space where the subject vehicle 2 does not prefer running or should not run.

In FIG. 10, let us suppose that the subject vehicle 2 deviates from the running lane and enters the opposite lane. The driving assistance information processing section 27 of the ECU 10 detects an unsafe condition at S230. The driving assistance information processing section 27 generates a targeted control value for returning the subject vehicle 2 to the safe space and transmits the value to the LAN bus 100 at S240 and S250.

The ECU 10 provides a specified control for ensuring running safety. The example uses a vehicle posture stabilizing control as shown and described, for example, in box (A) in FIG. 10. Specifically, an output for the brake, accelerator, or engine is automatically controlled to stabilize the vehicle direction. That is, the ECU 10 controls the brake, accelerator, or engine of the subject vehicle 2.

When the subject vehicle 2 further travels the opposite lane, the ECU 10 determines a risk of collision with the nearby vehicle 80, such as vehicle U, running in the opposite lane at S230. The ECU 10 generates a targeted control value for avoiding the collision and transmits the value to the LAN bus 100 at 240 and S250. For example, the ECU 10 provides control for improving the capability of turning to the left in order to return to the running lane. That is, the ECU 10 controls the steering unit of the subject vehicle 2. Consequently, the subject vehicle 2 easily turns to the left and returns to the running lane for avoiding an accident.

Figure 11:
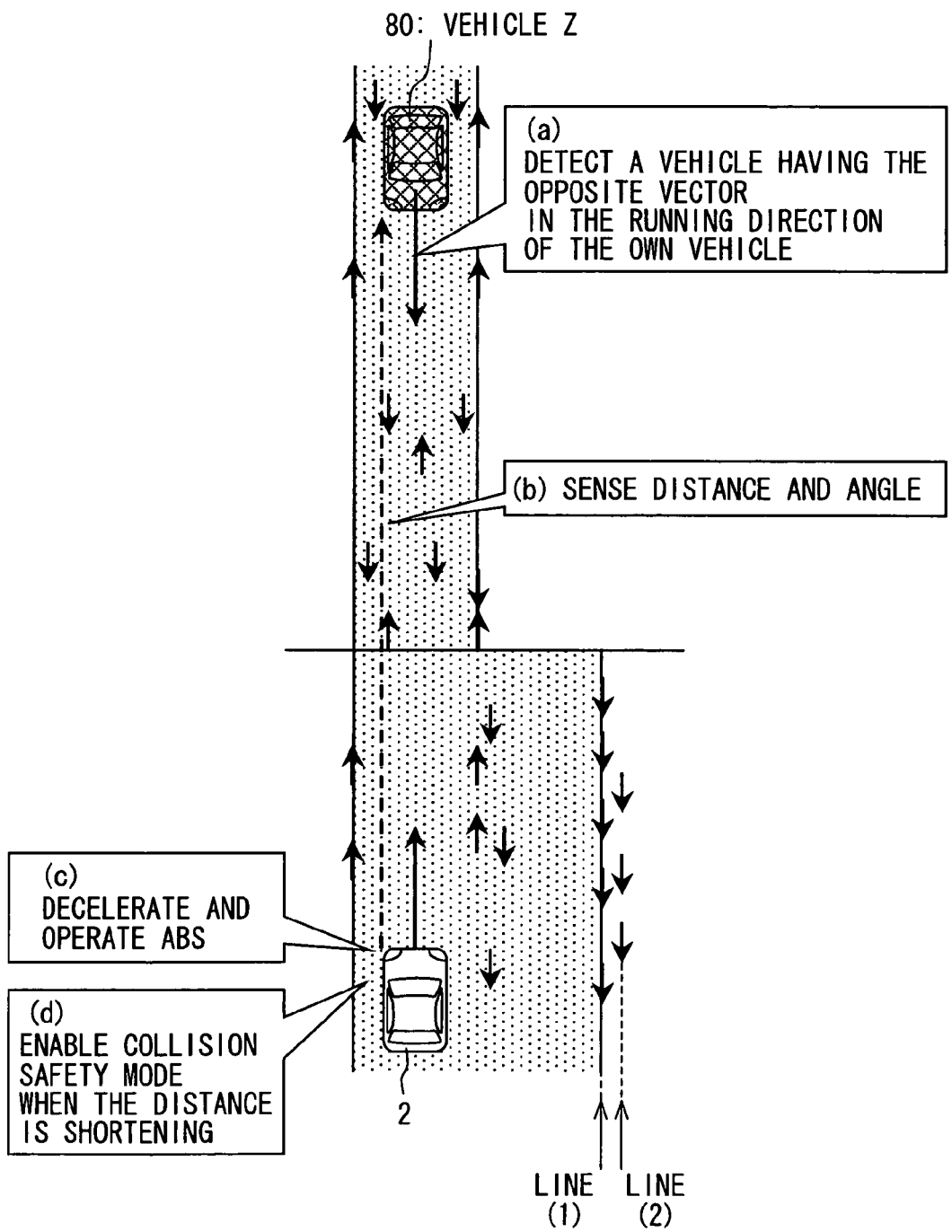
FIG. 11 is a diagram illustrating another collision avoidance effect and other effects of an exemplary embodiment.

FIG. 11 will now be described. In FIG. 11, line (1) is assumed to be more frequently formed as a vehicular swept path than line (2). Therefore, line (1) is used to mark the edge of the road space however, line (2) could alternatively be used to mark the edge of the road space.

In FIG. 11, let us suppose that the subject vehicle 2 detects the nearby vehicle 80 as vehicle V having a vector opposite to the running direction of the subject vehicle 2 on a running route for the subject vehicle 2 such as shown in box (a) in FIG. 11 and S110, S210, and S220.

The subject vehicle 2 detects relative positional relation with the vehicle V such as a relative distance and a relative angle and determines a chance of collision as shown for example, in connection with box (b) in FIG. 11 and S230. When the chance of collision is determined, the ECU 10 calculates a targeted control value for avoiding the collision and transmits the calculated value to the LAN bus 100 as described and shown in connection with S240 and S250 of FIG. 7. For example, a braking device operates for deceleration and an Antilock Brake System or ABS operates as shown in connection with box (c) in FIG. 11.

When the distance is shortening, the ECU 10 or the driving assistance information processing section 27 provides control to enable a collision safety mode as shown in connection with box (d) in FIG. 11. While the example of the X-Y plane has been described, FIG. 12 and FIG. 13 show an example of the height direction.

Figure 12:
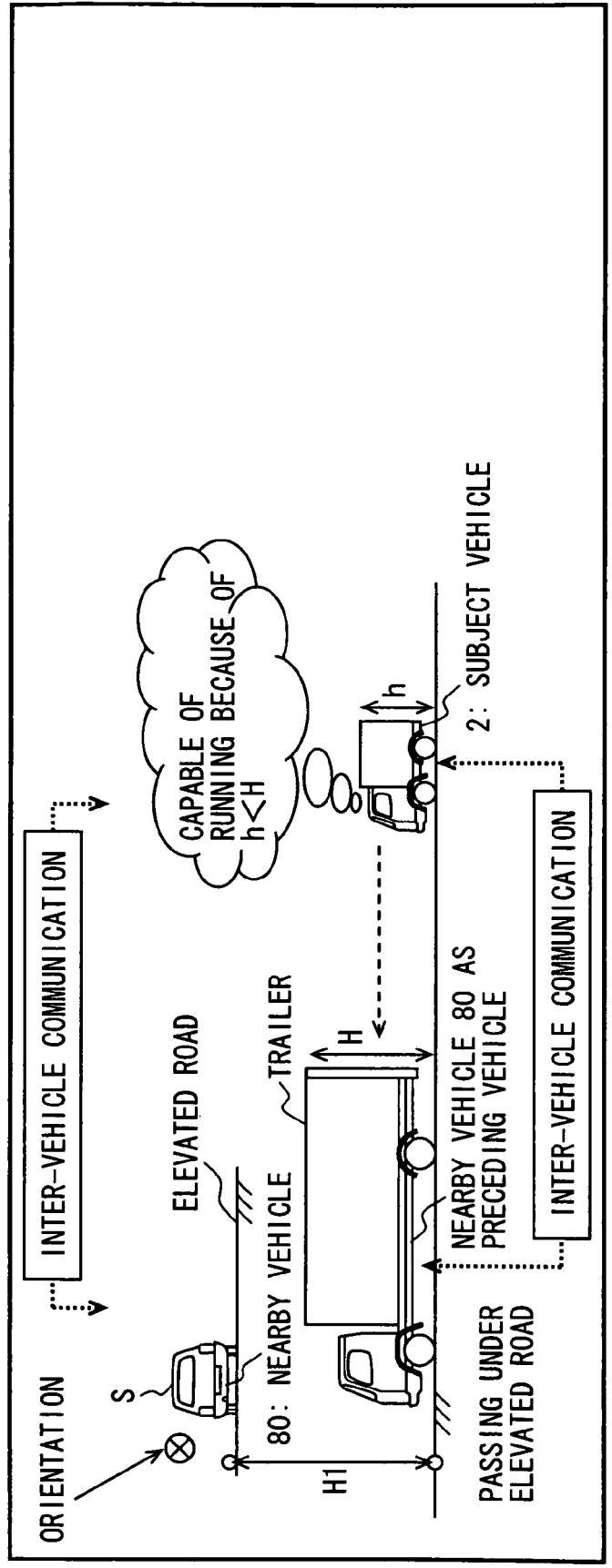
FIG. 12 is a diagram illustrating another effect of an exemplary embodiment.
Figure 13:
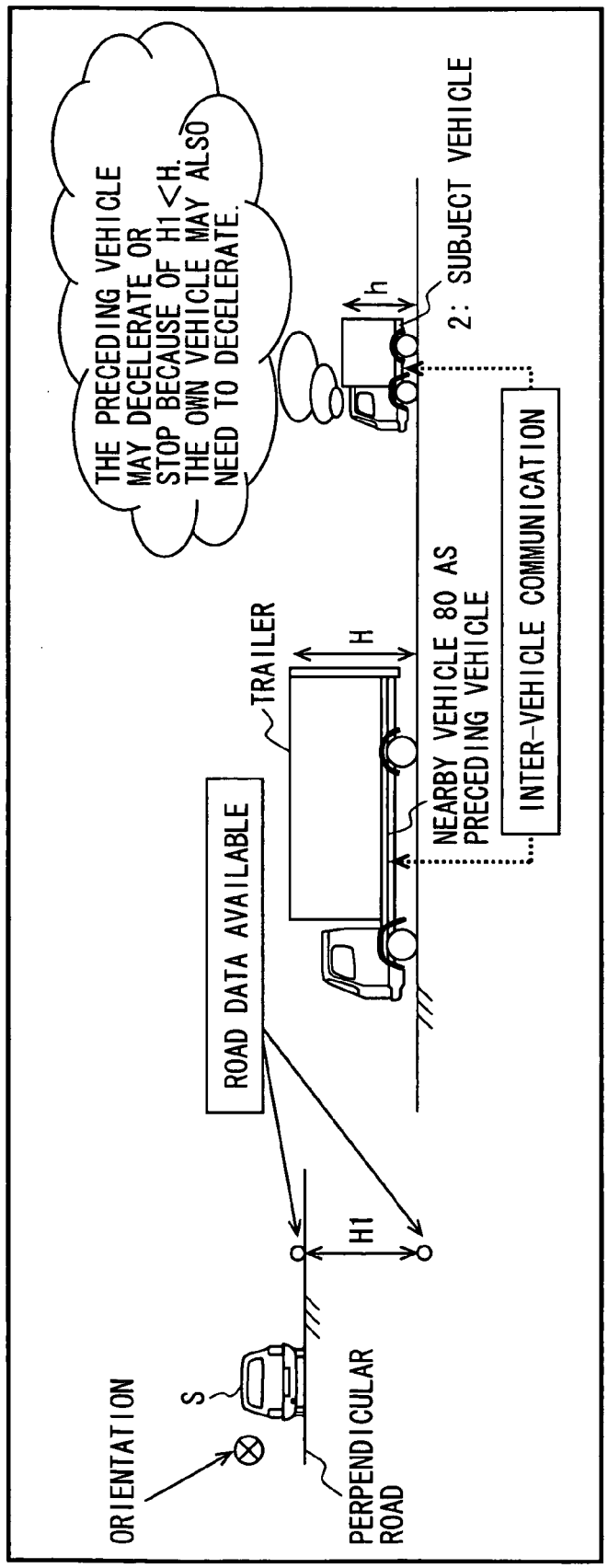
FIG. 13 is a diagram illustrating still another effect of an exemplary embodiment.

In FIG. 12 and FIG. 13, the overall height h of the subject vehicle 2 is smaller than the overall height H of the preceding vehicle as trailer. FIG. 12 shows an elevated road over the running route for the subject vehicle 2 and the preceding vehicle as trailer. A height H1 is measured between the road surface for the subject vehicle 2 and the preceding vehicle, shown as a trailer, to run and the elevated road surface and indicates a magnitude relation of H1>H>h. As mentioned above, the subject vehicle 2 uses the inter-vehicle communication to receive information representing dimensions of the preceding vehicle and the vehicular swept path.

In FIG. 12, let us suppose that the subject vehicle 2 recognizes the existence of the elevated road and capability of the preceding vehicle as trailer to pass under the elevated road. In such a case, it is determined that the subject vehicle 2 can also pass under the elevated road at S230. On the other hand, let us suppose that the subject vehicle 2 recognizes capability of the preceding vehicle as trailer to pass under the elevated road and the height of the preceding vehicle as trailer is smaller than that of the subject vehicle 2. In such a case, it is uncertain whether the subject vehicle 2 can pass under the elevated road. Also, the display provided for the subject vehicle 2 displays information about uncertainty or lack of safety with regard to passing of the subject vehicle 2 under the elevated road at S230 through S250.

When the preceding vehicle recognizes the existence of the elevated road, the information about the elevated road may be transmitted to the subject vehicle 2 through the inter-vehicle communication. The subject vehicle 2 can use the inter-vehicle communication to receive the information about the elevated road and recognize the existence of the elevated road, enabling more appropriate driving assistance. Inter-vehicle is useful when the subject vehicle 2 does not approach a specified range of the elevated road and cannot recognize the existence of the elevated road. In FIG. 12, the subject vehicle 2 uses the inter-vehicle communication to acquire shape information and behavior of a vehicle S as the nearby vehicle 80. In such a manner, the subject vehicle 2 determines a possibility of collision with the vehicle S, for example.

In FIG. 13, let us suppose that a road for the subject vehicle 2 and the preceding vehicle connects or links with another perpendicular road at a given point hereafter referred to as a perpendicular road. The example assumes entry to a bank road along a river from a city road. According to the example in FIG. 13, the height H1 is measured between the road surface for the subject vehicle 2 and the preceding vehicle as trailer to run and the perpendicular road surface and indicates a magnitude relation of H1<H>h.

The subject vehicle 2 recognizes that the height H1 of the perpendicular road is smaller than the height H of the preceding vehicle as trailer. It is unclear whether the preceding vehicle as trailer can cross the perpendicular road in such a way as passing under the road as shown in FIG. 12. In such a case, the ECU 10 determines that the preceding vehicle as trailer may decelerate or stop at S230. The ECU 10 provides control so that the subject vehicle 2 decelerates at S240 and S250. The display provided for the subject vehicle 2 displays information about the lack of safety at S240 and S250.

Similarly to the example in FIG. 12, the example in FIG. 13 may assume that the preceding vehicle can recognize the existence of the perpendicular road. The inter-vehicle communication may be used to transmit the information about the perpendicular road to the subject vehicle 2. The subject vehicle 2 can thereby provide more appropriate driving assistance.

As mentioned above, the embodiment uses detection results from the subject vehicle behavior detection section 21 and the nearby vehicle behavior detection section 24 to generate road map data matching the actual road environment or form a three-dimensional space as the vehicular swept path for the subject vehicle 2 or the nearby vehicle 80. The embodiment can provide more accurate driving assistance based on the road map data matching the actual road environment. Specifically, the subject vehicle 2 takes the actual road environment into consideration and notifies a driver whether or not the subject vehicle 2 can travel the vehicular swept path for the nearby vehicle 80 similarly to the nearby vehicle 80. The driver can recognize safety or a lack of safety regarding the running of the vehicle. The embodiment controls and supports the subject vehicle 2 when the subject vehicle 2 runs through an unsafe space or has a risky condition such as collision with the nearby vehicle 80. Specifically, the embodiment controls the braking device, the accelerator, or the steering unit so that the subject vehicle 2 can avoid an accident. The embodiment can reduce the likelihood of an accident.

The embodiment more approximates the actual road environment by using the vehicular swept path for the largest nearby vehicle 80 as a road map. The embodiment provides the following effect when using the vehicular swept path formed by one or more nearby vehicles 80 as a road map. Specifically, there may be a vehicle that happens to stop at the side of the road and generates a vehicular swept path. Such vehicular swept path is not used as a road map. The resulting road map matches the actual road environment.

The embodiment can use the storage section 26 to store a generated three-dimensional map as a road map. The accurate driving assistance matching the actual road environment is available in any locations.

In the embodiment, the ECU 10 can act as a driving assistance apparatus. The nearby vehicle behavior detection section 24 can act as a nearby vehicle dimension acquisition means and a running state information acquisition means. The running space modeling section 25 can act as a space formation means. The driving assistance information processing section 27 can act as a passing determination means, a notification control means, and a control support means. The subject vehicle behavior detection section 21 can act as a position detection means and a subject vehicle behavior detection means. The storage section 26 can act as a storage means.

While the present embodiment has been described, it is to be distinctly understood that the invention is not limited thereto but may be otherwise variously embodied. For example, according to an embodiment, the vehicle can be represented as a rectangular solid. However, it will be appreciated that the vehicle may be alternatively represented as a solid having curved surfaces similar to the original vehicle shape. Further, the vehicle may be represented as a cube having a side dimension that corresponds to a maximum dimension such as the length L or a minimum dimension such as the width W or the height H.

Further, according to an embodiment, the running space modeling section 25 recognizes the vehicle as a rectangular solid and generates a three-dimensional space as road map data, namely a vehicular swept path for the rectangular solid. A new three-dimensional space as road map data may be formed by adding a specified extra space to or excluding a specified space from the generated three-dimensional space.

In an embodiment, sound or light may further be used to notify information about the safety of vehicle running whether it is safe or unsafe. The notification method may be used otherwise when it can be recognized by a human.

In an embodiment, the inter-vehicle communication may be used to exchange a map or road map generated in a vehicle between vehicles so as to share the map among vehicles making it possible to decrease a processing load for generating the map or road map in each vehicle.

The map or road map generated in the vehicle may be transmitted to an external center or a server that stores the generated map. Each of the vehicles may download the map or road map as needed.

In an embodiment, the subject vehicle 2 may be subject to the vehicle posture stabilizing control or may enter the collision safety mode. In such case, the subject vehicle 2 may be determined to deviate from a road the subject vehicle 2 should run. It may be advantageous to avoid using the vehicular swept path for the subject vehicle 2 as road map data. The nearby vehicle 80 may also use the inter-vehicle communication to transmit and receive information about whether the nearby vehicle 80 is subject to the vehicle posture stabilizing control or enters the collision safety mode. Similarly, it is possible to avoid using the vehicular swept path for the nearby vehicle 80 as road map data in such situations as indicated by information from the inter-vehicle communication.

What is claimed is:

1. A driving assistance apparatus capable of being mounted on a subject vehicle and providing driving assistance for a driver of the subject vehicle, the apparatus comprising:

a nearby vehicle dimension acquisition means for acquiring an exterior dimension of a nearby vehicle running near the subject vehicle;

a running state information acquisition means for acquiring running state information indicating a running state of the nearby vehicle;

a space formation means for forming a nearby vehicle virtual solid which is three-dimensional using the exterior dimension of the nearby vehicle and for forming a virtual three-dimensional space associated with a moving locus of the nearby vehicle virtual solid by following a vehicular swept path of the nearby vehicle included in the running state information acquired by the running state information acquisition means;

a subject vehicle dimension acquisition means for acquiring an exterior dimension of the subject vehicle;

a passing determination means for forming a subject vehicle virtual solid which is three-dimensional using the exterior dimension of the subject vehicle and for determining whether the subject vehicle virtual solid is capable of passing through the virtual three-dimensional space; and a notification control means for providing a notification to the subject vehicle of a determination result from the passing determination means as to whether or not the subject vehicle virtual solid which is three-dimensional is capable of passing through the virtual three-dimensional space.

2. The driving assistance apparatus of claim 1, comprising:

a position detection means for detecting a current position of the subject vehicle, wherein the passing determination means is further for determining:

whether the subject vehicle virtual solid, when positioned at the current position, is contained in the virtual three-dimensional space formed by the space formation means;

that the subject vehicle virtual solid is able to pass through the virtual three-dimensional space when the subject vehicle virtual solid is contained in the virtual three-dimensional space; and that the subject vehicle virtual solid is unable to pass through the virtual three-dimensional space when the subject vehicle virtual solid is not contained in the virtual three-dimensional space.

3. The driving assistance apparatus of claim 2, comprising:

a subject vehicle behavior detection means for detecting a first behavior of the subject vehicle, wherein the passing determination means is further for adjusting a second behavior of the subject vehicle virtual solid to the first behavior of the subject vehicle and determines whether the subject vehicle virtual solid is contained in the virtual three-dimensional space.

4. The driving assistance apparatus of claim 2, wherein:

the nearby vehicle dimension acquisition means further acquires an exterior dimension of each of a plurality of nearby vehicles;

the running state information acquisition means acquires running state information about the each of the plurality of the nearby vehicles;

the space formation means forms a plurality of nearby vehicle virtual solids, each of the plurality of nearby vehicle virtual solids having the exterior dimension of the each of the plurality of nearby vehicles and forms a virtual three-dimensional space as a moving locus for the each of the plurality of the nearby vehicle virtual solids; and the passing determination means:

uses a maximum allowable three-dimensional space that belongs to the virtual three-dimensional space and represents the moving locus based on a largest of the plurality of nearby vehicle virtual solids; and is further for determining whether the subject vehicle virtual solid is contained in the maximum allowable three-dimensional space.

5. The driving assistance apparatus of claim 2, wherein:

the nearby vehicle dimension acquisition means acquires an exterior dimension of each of a plurality of nearby vehicles;

the running state information acquisition means acquires running state information about the each of the plurality of the nearby vehicles;

the space formation means forms a plurality of nearby vehicle virtual solids associated with the plurality of nearby vehicles and forms a virtual three-dimensional space as a moving locus for the each of the plurality of the nearby vehicle virtual solids, the virtual space three-dimensional including a frequent three-dimensional space that is most frequently formed; and the passing determination means determines whether the subject vehicle virtual solid is contained in the frequent three-dimensional space.

6. The driving assistance apparatus of claim 1, further comprising a storage means for storing information representing the virtual three-dimensional space, wherein the passing determination means, in the determining whether the subject vehicle virtual solid is capable of passing through the virtual three-dimensional space, reads the information representing the virtual three-dimensional space from the storage means.

7. The driving assistance apparatus of claim 4, wherein the notification control means is further for providing the notification based on the determination of whether the subject vehicle virtual solid is contained in the maximum allowable three-dimensional space.

8. The driving assistance apparatus of claim 5, wherein the notification control means is further for providing the notification based on the determination of whether the subject vehicle virtual solid is contained in the frequent three-dimensional space.

9. A driving assistance apparatus capable of being mounted on a subject vehicle and providing driving assistance for the subject vehicle, the apparatus comprising:

a nearby vehicle dimension acquisition means for acquiring an exterior dimension of a nearby vehicle running near the subject vehicle;

a running state information acquisition means for acquiring running state information indicating a running state of the nearby vehicle;

a space formation means for forming a nearby vehicle virtual solid which is three-dimensional using the exterior dimension of the nearby vehicle and for forming a virtual three-dimensional space as a moving locus of the nearby vehicle virtual solid, wherein the nearby vehicle virtual solid forms the moving locus by following a vehicular swept path for the nearby vehicle included in the running state information;

a subject vehicle dimension acquisition means for acquiring an exterior dimension of the subject vehicle; and a passing determination means for forming a subject vehicle virtual solid which is three-dimensional, using the dimension of the subject vehicle and for determining whether the subject vehicle virtual solid is able to pass the virtual three-dimensional space formed by the space formation means, wherein the driving assistance apparatus provides driving assistance for the subject vehicle based on a determination result from the passing determination means as to whether or not the subject vehicle virtual solid which is three-dimensional is capable of passing through the virtual three-dimensional space.

10. The driving assistance apparatus of claim 9, further comprising a position detection means for:
   detecting a current position of the subject vehicle, the passing determination means further for determining whether the subject vehicle virtual solid, when positioned at the current position, is contained in the virtual three-dimensional space formed by the space formation means;
   determining that the subject vehicle virtual solid is capable of passing through the virtual three-dimensional space when the subject vehicle virtual solid is contained in the virtual three-dimensional space; and
   determining that the subject vehicle virtual solid is unable to pass the virtual three-dimensional space when the subject vehicle virtual solid is not contained in the virtual three-dimensional space.

11. The driving assistance apparatus of claim 10, further comprising a subject vehicle behavior detection means for detecting a first behavior of the subject vehicle,
   wherein the passing determination means is further for adjusting a second behavior of the subject vehicle virtual solid to the first behavior and for determining whether the subject vehicle virtual solid is contained in the virtual three-dimensional space formed by the space formation means.

12. The driving assistance apparatus of claim 10, wherein:
   the nearby vehicle dimension acquisition means acquires an exterior dimension of each of a plurality of nearby vehicles;
   the running state information acquisition means acquires running state information about each of a plurality of the nearby vehicles;
   the space formation means a plurality of nearby vehicle virtual solids associated with the plurality of nearby vehicles and forms a virtual three-dimensional space as a moving locus for each of a plurality of the nearby vehicle virtual solids; and
   the passing determination means is further for:
      using a three-dimensional space, hereafter referred to as a maximum allowable three-dimensional space, that belongs to the virtual three-dimensional space formed by the space formation means and represents a moving locus for a largest nearby vehicle virtual solid; and
      determining whether the subject vehicle virtual solid is contained in the maximum allowable three-dimensional space.

13. The driving assistance apparatus of claim 10, wherein:
   the nearby vehicle dimension acquisition means acquires an exterior dimension of each of a plurality of nearby vehicles;
   the running state information acquisition means acquires running state information about each of a plurality of the nearby vehicles;
   the space formation means a plurality of nearby vehicle virtual solids associated with the plurality of nearby vehicles and forms a virtual three-dimensional space as a moving locus for each of a plurality of the nearby vehicle virtual solids; and
   the passing determination means is further for:
      using a three-dimensional space, hereafter referred to as a frequent three-dimensional space, that belongs to the virtual three-dimensional space formed by the space formation means and is most frequently formed; and
      determining whether or not the subject vehicle virtual solid is contained in the frequent three-dimensional space.

14. The driving assistance apparatus of claim 9, comprising:
   a storage means for storing information representing the virtual three-dimensional space formed by the space formation means,
   wherein the passing determination means reads information representing the virtual three-dimensional space stored in the storage means from the storage means.

15. The driving assistance apparatus of claim 9, further comprising a control support means for supporting a specified control object in the subject vehicle when the passing determination means determines that the subject vehicle virtual solid is unable to pass through the virtual three-dimensional space.

16. The driving assistance apparatus of claim 15, wherein:
   the control object is a braking device provided for the subject vehicle; and the control support means supports braking control using the braking device.

17. The driving assistance apparatus of claim 15, wherein:
   the control object is an accelerator provided for the subject vehicle; and
   the control support means supports throttle angle control using the accelerator.

18. The driving assistance apparatus of claim 15, wherein:
   the control object is a steering unit provided for the subject vehicle; and
   the control support means supports steering control using the steering unit.

19. The driving assistance apparatus of claim 9, further comprising:
   a nearby vehicle behavior detection means for detecting a first behavior of the nearby vehicle, wherein:
   the space formation means is further for adjusting a second behavior of the nearby vehicle virtual solid to the first behavior and for forming a virtual three-dimensional space as a moving locus of the nearby vehicle virtual solid; and
   the nearby vehicle virtual solid is further for forming the moving locus by following a vehicular swept path acquired by the running state information acquisition means.

20. The driving assistance apparatus of claim 9, wherein:
   the space formation means forms a new three-dimensional space by adding a specified extra space to a formed three-dimensional space.

21. The driving assistance apparatus of claim 9, wherein:
   the nearby vehicle dimension acquisition means acquires an exterior dimension of each of a plurality of nearby vehicles;
   the running state information acquisition means acquires running state information about the each of the plurality of the nearby vehicles;
   the space formation means a plurality of nearby vehicle virtual solids associated with the plurality of nearby vehicles and forms a virtual three-dimensional space as a moving locus for the each of the plurality of the nearby vehicle virtual solids; and the passing determination means is further for:
- using a maximum allowable three-dimensional space associated with the virtual three-dimensional space and representing a moving locus for a largest one of the plurality of nearby vehicle virtual solids; and
- determining whether the subject vehicle virtual solid is able to pass through the maximum allowable three-dimensional space.

22. The driving assistance apparatus of claim 9, wherein:
the nearby vehicle dimension acquisition means acquires an exterior dimension of each of a plurality of nearby vehicles;
the running state information acquisition means acquires running state information about the each of the plurality of the nearby vehicles;
the space formation means a plurality of nearby vehicle virtual solids associated with the plurality of nearby vehicles and forms a virtual three-dimensional space as a moving locus for the each of the plurality of the nearby vehicle virtual solids; and
the passing determination means uses a three-dimensional space, hereafter referred to as a frequent three-dimensional space, that belongs to the virtual three-dimensional space formed by the space formation means and is most frequently formed; and
determines whether or not the subject vehicle virtual solid is able to pass through the frequent three-dimensional space.

23. The driving assistance apparatus of claim 9, wherein:
the exterior dimensions of the nearby vehicle acquired by the nearby vehicle dimension acquisition means include an overall length, an overall width, and an overall height of the nearby vehicle; and
the exterior dimensions of the subject vehicle acquired by subject vehicle dimension acquisition means include an overall length, an overall width, and an overall height of the subject vehicle.

24. The driving assistance apparatus of claim 9, wherein:
the exterior dimensions of the nearby vehicle acquired by the nearby vehicle dimension acquisition means include a wheel base length, a tread length, and a gravity center height of the nearby vehicle; and
the exterior dimensions of the subject vehicle acquired by subject vehicle dimension acquisition means include a wheel base length, a tread length, and a gravity center height of the subject vehicle.

25. The driving assistance apparatus of claim 9, further comprising:
a communication apparatus for transmitting and receiving information between the subject vehicle and the nearby vehicle; and
a storage apparatus storing information representing the exterior dimension of one or more of the subject vehicle and the nearby vehicle; wherein:
the nearby vehicle dimension acquisition means acquires the information representing the exterior dimension of the nearby vehicle using the communication apparatus; and
the subject vehicle dimension acquisition means acquires information representing an exterior dimension of the subject vehicle from the storage apparatus of the subject vehicle.

26. The driving assistance apparatus of claim 9, further comprising:
a detection apparatus for detecting a running state of the vehicle; and
a communication apparatus for transmitting and receiving information between the subject vehicle and the nearby vehicle,
wherein the information indicating the running state of the nearby vehicle is acquired from the communication apparatus.

27. The driving assistance apparatus of claim 9, wherein the nearby vehicle precedes the subject vehicle on a running route for the subject vehicle.

28. The driving assistance apparatus of claim 9, further comprising:
a storage means for storing information representing the virtual three-dimensional space formed by the space formation means,
wherein the passing determination means reads the information representing the virtual three-dimensional space stored in the storage means from the storage means.

* * * * *